United States Patent [19]

Yoshida

[11] Patent Number: 5,761,342

[45] Date of Patent: Jun. 2, 1998

[54] IMAGE PROCESSING APPARATUS AND METHOD

[75] Inventor: Tadashi Yoshida, Ichikawa, Japan

[73] Assignee: Canon Kabushiki Kaisha, Tokyo, Japan

[21] Appl. No.: 402,325

[22] Filed: Mar. 10, 1995

Related U.S. Application Data

[63] Continuation of Ser. No. 868,682, Apr. 15, 1992, abandoned.

[30] Foreign Application Priority Data

Apr. 16, 1991 [JP] Japan ................................. 3-084028
Apr. 22, 1991 [JP] Japan ................................. 3-090747

[51] Int. Cl.$^6$ ............................................ H04N 7/50
[52] U.S. Cl. ................... 382/234; 382/240; 348/397
[58] Field of Search ........................... 382/232, 234, 382/240, 247, 233; 348/393, 395, 438, 397, 398; 358/426, 433

[56] References Cited

U.S. PATENT DOCUMENTS

| | | | |
|---|---|---|---|
| 5,022,091 | 6/1991 | Carlson | 382/240 |
| 5,057,940 | 10/1991 | Murakami et al. | 358/426 |
| 5,086,487 | 2/1992 | Katayama et al. | 382/56 |
| 5,089,884 | 2/1992 | Suzuki et al. | 358/80 |
| 5,107,348 | 4/1992 | Citta et al. | 348/398 |
| 5,136,374 | 8/1992 | Jayant et al. | 348/398 |
| 5,136,396 | 8/1992 | Kato et al. | 358/426 |
| 5,150,433 | 9/1992 | Daly | 382/250 |
| 5,155,594 | 10/1992 | Bernstein et al. | 358/136 |
| 5,161,205 | 11/1992 | Moran et al. | 382/56 |
| 5,216,719 | 6/1993 | Oh | 348/398 |

OTHER PUBLICATIONS

Langdon et al., "Compression of Black–White Images with Arithmetic Coding", in IEEE Communications, vol. COM–29, No. 6, pp. 858–867, Jun. 1981.

Primary Examiner—Leo Boudreau
Assistant Examiner—Christopher S. Kelley
Attorney, Agent, or Firm—Fitzpatrick, Cella, Harper & Scinto

[57] ABSTRACT

A color image, including both a binary color image and a multivalue color image, can be encoded without any image degradation, and an image can be immediately checked at the time of encoding.

In a color image encoding apparatus for encoding a multivalue color image, an image is separated into a binary color image and a multivalue color image, and the binary color image is hierarchically encoded.

A feature portion is extracted from an original image, and the extracted feature portion is binarized to form a binary color image. The binary color image is encoded in accordance with information preservation encoding, and a difference image between the original image and the binary color image is hierarchically encoded.

16 Claims, 23 Drawing Sheets

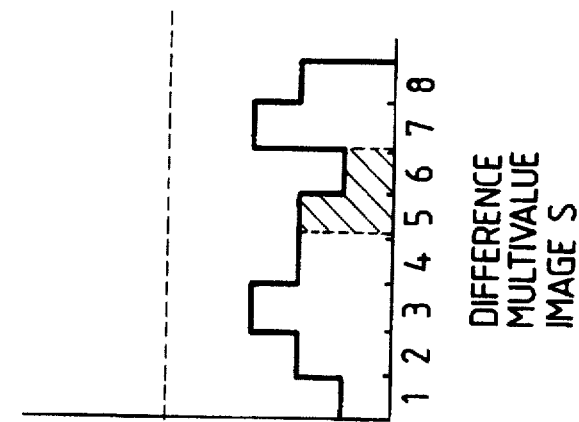
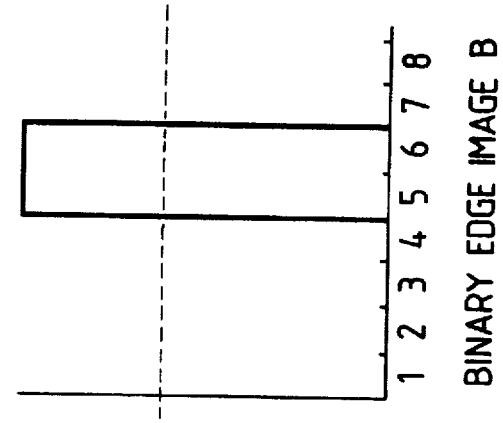
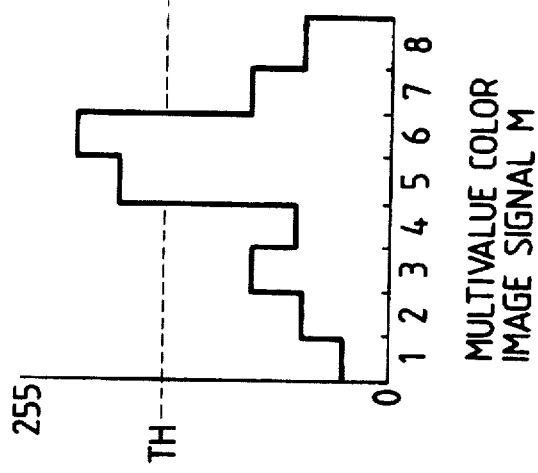

FIG. 17

| I | MC |
|---|----|
| 1 | 2 |
| 2 | 1 |
| 3 | 1 |
| 4 | 1 |
| 5 | 2 |
| 6 | 4 |
| 7 | 5 |
| 8 | 8 |
| 9 | 11 |
| 10 | 15 |
| 11 | 22 |
| 12 | 30 |
| 13 | 43 |
| 14 | 61 |
| 15 | 87 |
| 16 | 120 |
| 17 | 174 |
| 18 | 241 |
| 19 | 348 |
| 20 | 483 |

FIG. 18

| D | MPS | YN |
|---|-----|-----|
| 0 | 0 | 0 |
| 0 | 1 | 1 |
| 1 | 0 | 1 |
| 1 | 1 | 0 |

FIG. 19

| I | d=1 | | | | d=2 | | |
|---|---|---|---|---|---|---|---|
| | UPA=UPB=0 | UPA=1 | UPB=1 | | UPA=1 | UPB=1 | |
| | I' | I' | I' | EX | I' | I' | EX |
| 1 | 1 | 2 | 1 | 1 | 3 | 1 | 1 |
| 2 | 2 | 3 | 1 | 0 | - | - | - |
| 3 | 3 | 4 | 2 | 0 | 5 | 1 | 0 |
| 4 | 4 | 5 | 3 | 0 | - | - | - |
| 5 | 5 | 6 | 4 | 0 | 7 | 3 | 0 |
| 6 | 6 | 7 | 5 | 0 | - | - | - |
| 7 | 7 | 8 | 6 | 0 | 9 | 5 | 0 |
| 8 | 8 | 9 | 7 | 0 | - | - | - |
| 9 | 9 | 10 | 8 | 0 | 11 | 7 | 0 |
| 10 | 10 | 11 | 9 | 0 | - | - | - |
| 11 | 11 | 12 | 10 | 0 | 13 | 9 | 0 |
| 12 | 12 | 13 | 11 | 0 | - | - | - |
| 13 | 13 | 14 | 12 | 0 | 15 | 11 | 0 |
| 14 | 14 | 15 | 13 | 0 | - | - | - |
| 15 | 15 | 16 | 14 | 0 | 17 | 13 | 0 |
| 16 | 16 | 17 | 15 | 0 | - | - | - |
| 17 | 17 | 18 | 16 | 0 | 19 | 15 | 0 |
| 18 | 18 | 19 | 17 | 0 | - | - | - |
| 19 | 19 | 20 | 18 | 0 | 21 | 17 | 0 |
| 20 | 20 | 21 | 19 | 0 | - | - | - |
| 21 | 21 | 21 | 20 | 0 | 21 | 19 | 0 |

(-):DON'T CARE

FIG. 20

| I | EFFECTIVE PROBABILITY $q_1$ | COEFFICIENT | | ENCODE PARAMETER | | |
|---|---|---|---|---|---|---|
| | | $q_1$ | $q_2$ | $Q_1$ | $Q_2$ | $Q_3$ |
| 1 | 0.5000 | $2^{-2}$ | $2^{-2}$ | 2 | 2 | + |
| 2 | 0.4375 | $2^{-1}$ | $-2^{-4}$ | -1 | 4 | − |
| 3 | 0.3750 | $2^{-2}$ | $2^{-3}$ | 2 | 3 | + |
| 4 | 0.3125 | $2^{-2}$ | $2^{-4}$ | 2 | 4 | + |
| 5 | 0.2500 | $2^{-3}$ | $2^{-3}$ | 3 | 3 | + |
| 6 | 0.1875 | $2^{-3}$ | $2^{-4}$ | 3 | 4 | + |
| 7 | 0.1250 | $2^{-4}$ | $2^{-4}$ | 4 | 4 | + |
| 8 | 0.0938 | $2^{-4}$ | $2^{-5}$ | 4 | 5 | + |
| 9 | 0.0625 | $2^{-5}$ | $2^{-5}$ | 5 | 5 | + |
| 10 | 0.0469 | $2^{-5}$ | $2^{-6}$ | 5 | 6 | + |
| 11 | 0.0313 | $2^{-6}$ | $2^{-6}$ | 6 | 6 | + |
| 12 | 0.0234 | $2^{-6}$ | $2^{-7}$ | 6 | 7 | + |
| 13 | 0.0156 | $2^{-7}$ | $2^{-7}$ | 7 | 7 | + |
| 14 | 0.0117 | $2^{-7}$ | $2^{-8}$ | 7 | 8 | + |
| 15 | 0.0078 | $2^{-8}$ | $2^{-8}$ | 8 | 8 | + |
| 16 | 0.0059 | $2^{-8}$ | $2^{-9}$ | 8 | 9 | + |
| 17 | 0.0039 | $2^{-9}$ | $2^{-9}$ | 9 | 9 | + |
| 18 | 0.0029 | $2^{-9}$ | $2^{-10}$ | 9 | 10 | + |
| 19 | 0.0020 | $2^{-10}$ | $2^{-10}$ | 10 | 10 | + |
| 20 | 0.0015 | $2^{-10}$ | $2^{-11}$ | 10 | 11 | + |
| 21 | 0.0010 | $2^{-11}$ | $2^{-11}$ | 11 | 11 | + |

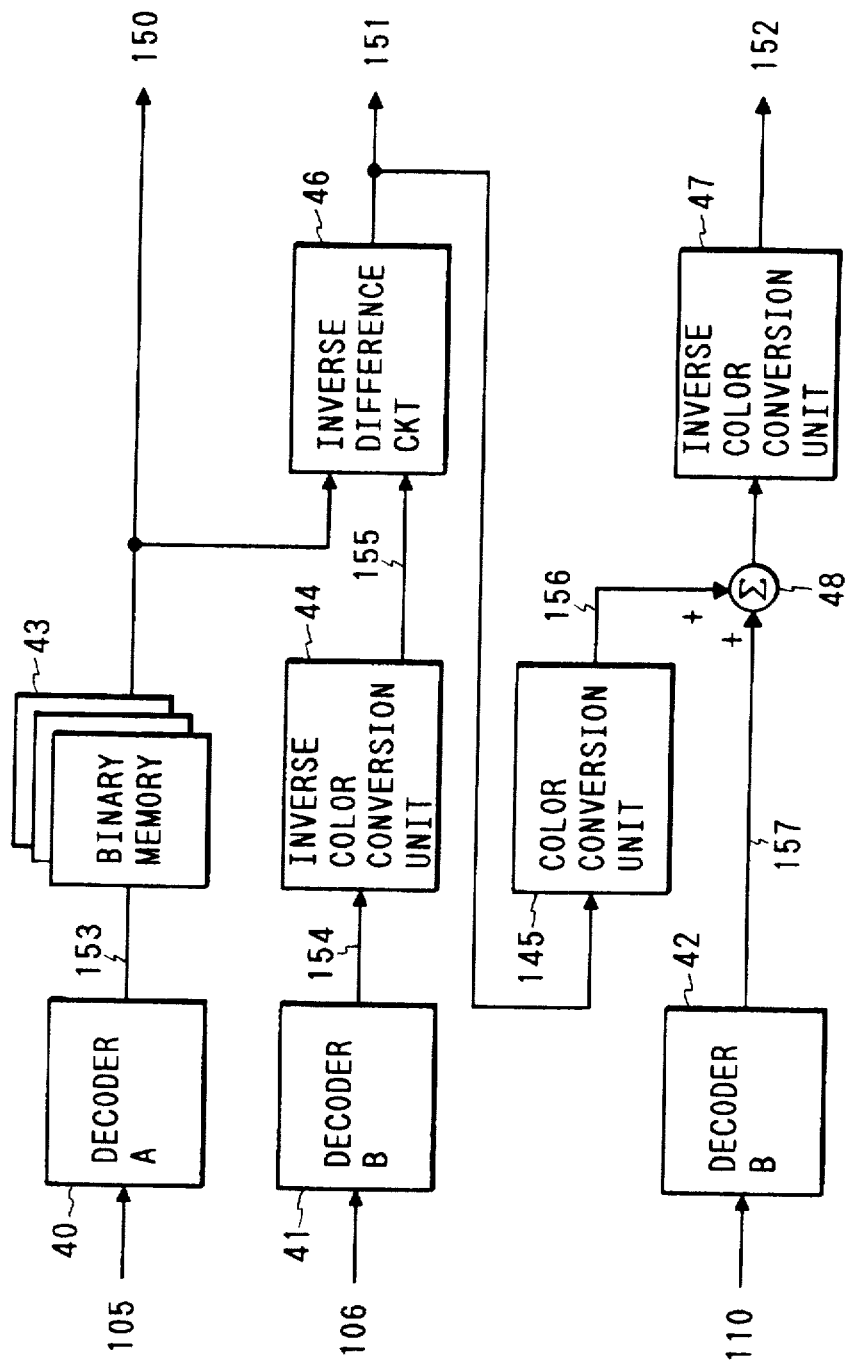

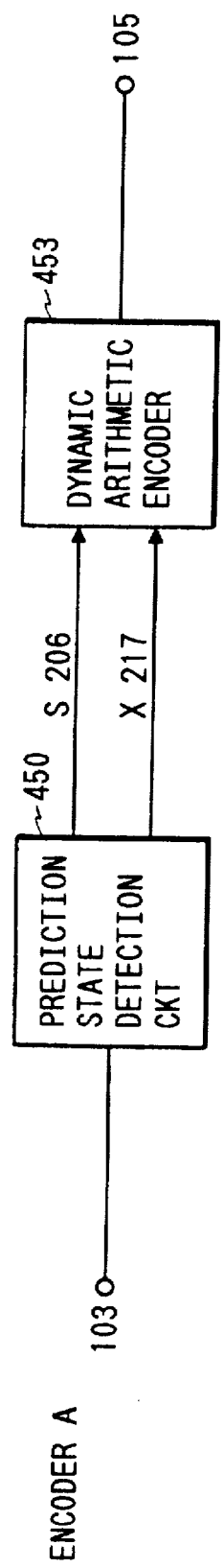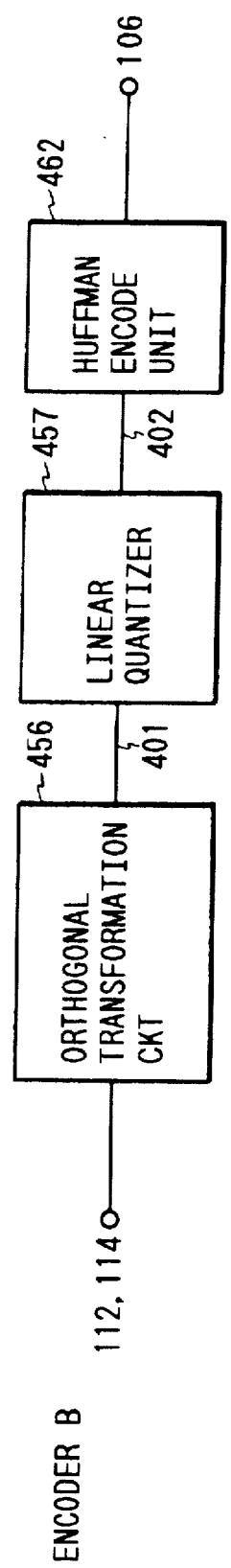

FIG. 26A  FIRST COLOR 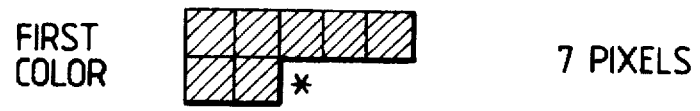 7 PIXELS
FIG. 26B  SECOND COLOR 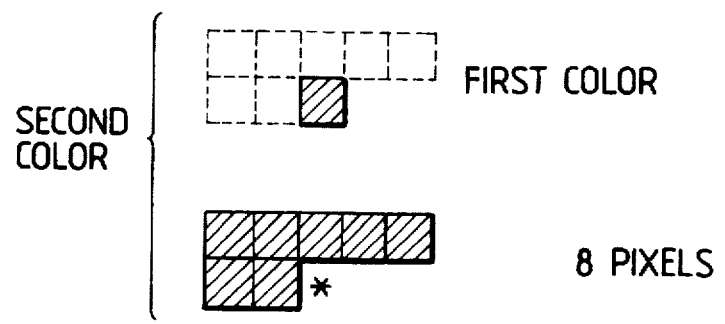 FIRST COLOR / 8 PIXELS
FIG. 26C  THIRD COLOR 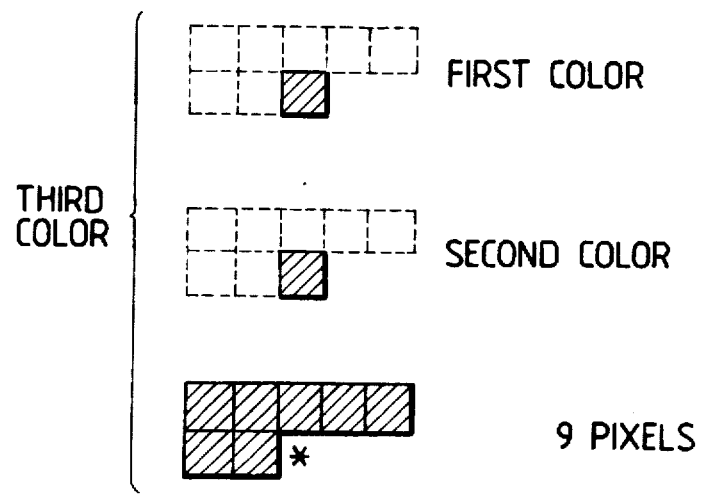 FIRST COLOR / SECOND COLOR / 9 PIXELS

IMAGE PROCESSING APPARATUS AND METHOD

This application is a continuation of application Ser. No. 07/868,682 Apr. 15, 1992 now abandoned.

BACKGROUND OF THE INVENTION

1. Field of the Invention

The present invention relates to an image processing apparatus used in color image communication and the like.

2. Related Background Art

Various conventional color still image encoding schemes have been proposed. Color still images as target objects are classified into the following two types:

(1) a binary color image in which eight colors, i.e., red, green, blue, cyan, magenta, yellow, white, and black are processed as binary data; and (2) a multivalue color image in which 16,700,000 colors are displayed by expressing red, green, and blue in accordance with 256 gray scale levels.

As a binary color image encoding scheme, a scheme using, in units of colors, a modified Huffman scheme serving as a variable-length encoding scheme currently used in a facsimile apparatus or the like is exemplified. Another scheme is a predictive encoding scheme for predicting a target pixel from neighboring pixels. These encoding schemes belong to reversible encoding schemes, and data upon encoding/decoding can be preserved.

On the other hand, as a multivalue color image encoding scheme, a scheme for converting 8-bit R, G, and B signals into a luminance signal and color difference signals, linearly quantizing coefficient values upon completion of orthogonal transform (discrete cosine transform), and performing variable-length encoding of the quantized values is exemplified. According to this scheme, a low-frequency component (in spatial frequency) of an image is basically left and a high-frequency component is cut off, thereby reducing the image data. This method is an irreversible encoding scheme, and an increase in compression ratio and degradation of image quality have a trade-off relationship.

Another multivalue color image hierarchical encoding scheme utilizing the trade-off relationship between the compression ratio and the image quality is also proposed. According to this method, an image obtained by reducing a multivalue image, by subsampling or the like, is quantized and encoded to obtain a low-resolution hierarchical image. A difference image between an original image and the decoded low-resolution image is quantized and encoded, thereby obtaining a high-resolution hierarchical image. The number of hierarchical levels may be increased in accordance with the number of subsampling levels. According to this method, it is possible to quickly grasp an image for preferentially encoding a low-resolution image having a smaller quantity of data.

When a color document image in which a color photograph is fitted in a color sentence portion is to be encoded, the following problems are posed:

(1) in a binary color scheme, even if the compression ratio of a color sentence portion can be increased, a gradation image of the color photograph cannot be efficiently encoded; and (2) in a multivalue color scheme, when the compression ratio is increased, high-frequency components of the image are largely cut off, and degradation in image quality of an edge portion of a character or the like becomes conspicuous. Therefore, the sentence portion is not expected to have a high compression ratio almost equal to that of the photograph.

It is possible to increase the compression ratio of a low-resolution image portion by using hierarchical encoding of a multivalue color image. However, image quality of an image including a large portion of a color document or a large number of edge portions is greatly degraded. The problem on quick grasp of the overall image is still left unsolved.

SUMMARY OF THE INVENTION

It is an object of the present invention to solve the conventional problems described above, i.e., to efficiently encode an image.

In order to achieve the above object of the present invention, there is disclosed an image processing apparatus comprising:

input means for inputting image data representing an original;

extracting means for extracting line image data representing a line image portion of the original from the image data;

first encoding means for encoding the line image data by a progressive encoding method; and second encoding means for encoding the image data other than the line image data by a sequential encoding method.

It is another object of the present invention to perform encoding within one frame in accordance with the nature of an image.

In order to achieve the above object of the present invention, there is provided an image processing apparatus comprising:

first encoding means for encoding input image data progressively;

second encoding means for encoding input image data sequentially; and selecting means for selecting encoded image data encoded by the first or second encoding means in one picture.

It is still another object of the present invention to efficiently transmit encoded image data.

In order to achieve the above object of the present invention, there is provided an image processing apparatus comprising:

receiving means for receiving line image data encoded by a progressive encoding method and other image data encoded by a sequential encoding method, both image data relating to one picture;

decoding means for decoding the line image data and the other image data; and displaying means for displaying the line image data progressively.

The above and other objects, features, and advantages of the present invention will be apparent from the detailed description and the appended claims in conjunction with the accompanying drawings.

BRIEF DESCRIPTION OF THE DRAWINGS

FIGS. 3A to 3C are graphs showing a difference operation;

FIG. 17 is a count table ROM;

FIG. 18 is a table showing a correspondence between an image signal and a YN signal;

FIG. 19 is a table showing an index updating method;

FIG. 20 is a table for explaining arithmetic encoding;

FIG. 22 is a view showing a low-pass filter;

FIG. 23 is a block diagram of a decode unit;

FIGS. 24A and 24B are block diagrams of encoders, respectively;

FIGS. 26A to 26C are block diagrams showing a reference pixel position;

DETAILED DESCRIPTION OF THE PREFERRED EMBODIMENTS

Preferred embodiments of the present invention will be described below.

(First Embodiment)

Figure 1:
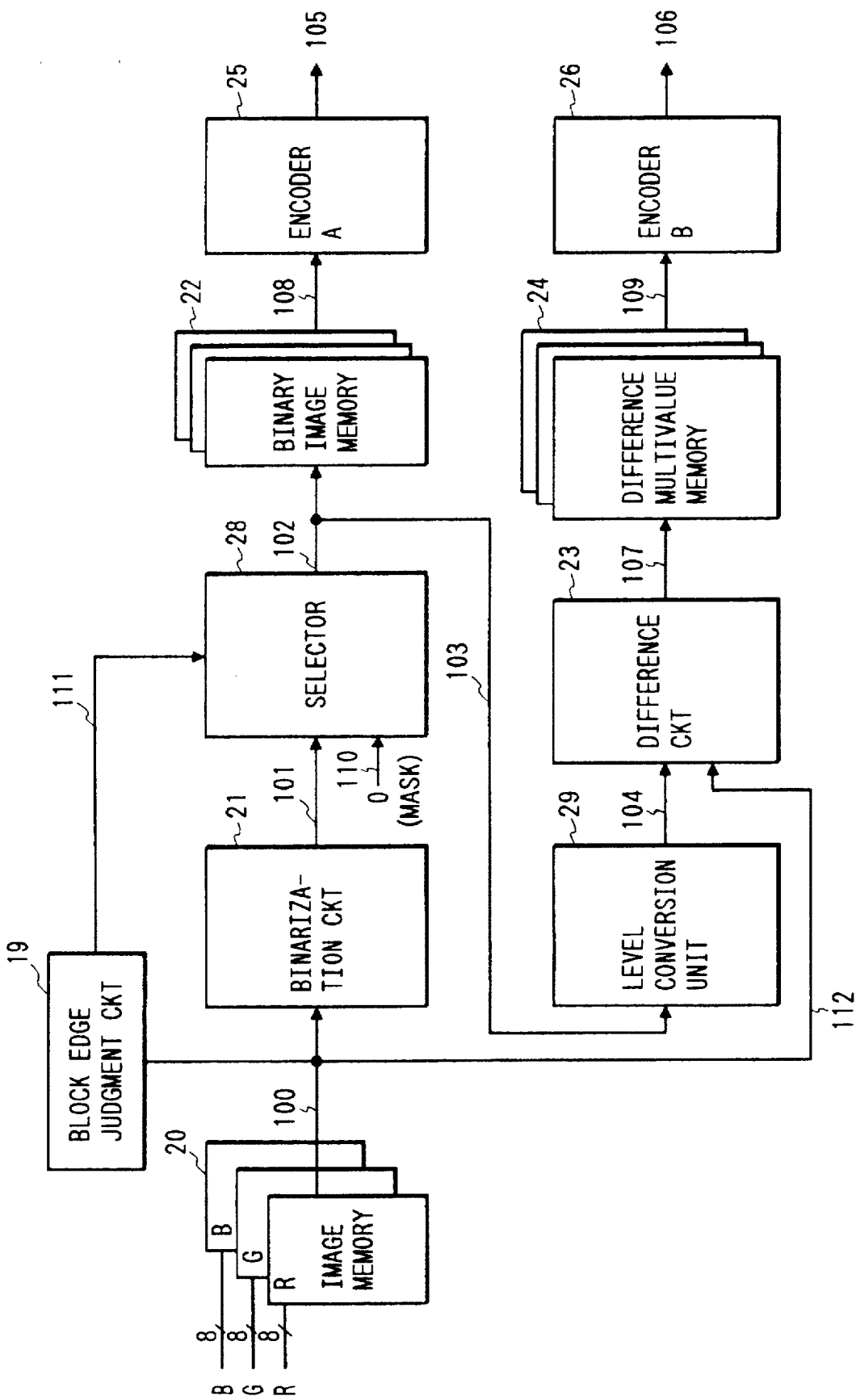
FIG. 1 is a block diagram of a color image encoding apparatus.

FIG. 1 shows an arrangement of an encode unit to which the present invention is applied.

8-bit multivalue color image signals, i.e., red (R), green (G), and blue (B), representing a full-color image input from a color still image input means, such as a color scanner (not shown) or the like are stored in an image memory 20.

A multivalue color image signal 100 read out from the image memory 20 is subjected to binarization processing in a binarization circuit 21 in units consisting of each color, and is converted into one-bit R, G, and B color signals.

A block edge judgment circuit 19 judges whether each block of the multivalue color image signal 100 is an edge portion. In this embodiment, one block consists of 8 pixels×8 pixels and is judged to be an edge or non-edge portion.

The signals binarized by the binarization circuit 21 are masked by a selector 28, in accordance with a mask signal 110, in units of blocks.

A block judgment signal 111 selects a binarization signal 101 for a block judged as an edge portion by the block edge detection circuit 19. The mask signal 110 is selected for a block judged as a non-edge portion. Therefore, only an edge image of the binarization images is stored in a binary image memory 22, through a line 102, in units of colors.

A binary color signal read out from the binary image memory 22, through a line 108 is encoded by an encoder A for encoding a binary color image. Encoded data 105 is output from the encoder A. Encoding processing by this encoder A is the first encoding processing.

The same color image signal subjected to the first encoding processing is read out from the image memory 20. This color signal is used to encode a portion, except for the binary edge image encoded by the first encoding processing. The binary edge image is input to a level conversion unit 29 through the line 102. The binary signal is level-converted into an 8-bit signal representing one of values, 0, 1, . . . , 255.

A difference circuit 23 calculates a difference between a level-converted binary image 104 and a multivalue color image 112. Difference signals are stored in a difference multivalue memory 24, through a line 107, in units of color components, R, G, and B. A multivalue color signal 109, stored in the difference multivalue memory 24, is encoded by an encoder B for encoding a multivalue color signal. An encoded word 106 is output from the encoder B. Encoding processing by the encoder B is defined as the second encoding processing.

Figure 2B:
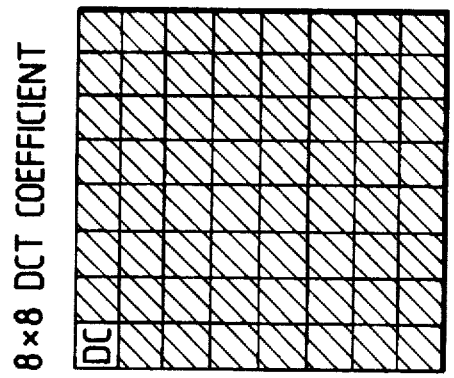
FIGS. 2A and 2B are views showing block edge determination.
Figure 2A:
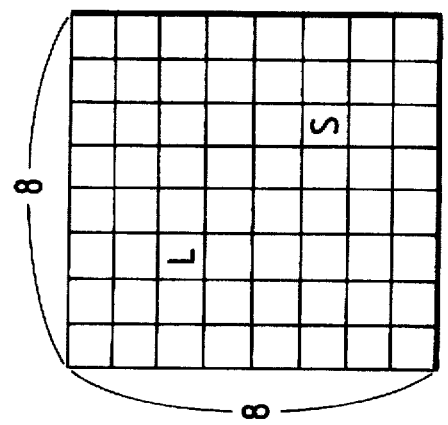

The block edge judgment circuit 19 uses the following decision technique in this embodiment, as shown in FIG. 2A. The edge portions of the R, G, and B components are independently detected in units of blocks (one block consists of 8 pixels×8 pixels, but the unit block is not limited to this size).

FIG. 2A exemplifies an edge detection method of calculating a difference P between a maximum value L and a minimum value S, i.e., P=L−S, in a block, and detecting an edge if the difference P exceeds a predetermined value (T=70, provided that a total number of levels is 256).

A method shown in FIG. 2B can also be used.

In the method of FIG. 2B, DCT conversion is performed for every block consisting of 8 pixels×8 pixels, and a sum of the absolute values of AC portions, except for DC portions of the converted coefficients, is calculated as follows:

$$S = \sum_{i \neq DC} |AC|$$

If the difference S exceeds the predetermined value, a portion of interest is judged as an edge portion. In this method, the sum of the AC coefficients is represented by a hatched region. An edge portion can be judged even if some of these coefficients are used.

FIGS. 3A to 3C show a relationship between a multivalue color image signal read out from the image memory 20, a binary edge image, and a difference multivalue image.

In this embodiment, edge judgment is performed in units of blocks each consisting of 8 pixels×8 pixels. FIGS. 3A to 3C show a case in which the block consisting of 8 pixels×8 pixels is regarded as a one-dimensional block. A multivalue color image signal M (FIG. 3A) for a block judged as an edge portion, is binarized in accordance with a threshold value TH. A level-converted result representing 0 or 255 represents a binary edge image B, as shown in FIG. 3B.

A difference multivalue image S shown in FIG. 3C represents the absolute value of the difference between the multivalue color image signal M and the binary edge image B, that is, S=|M−B|.

In this embodiment, the absolute value of the difference is calculated to eliminate a negative difference. A hatched portion in FIG. 3C represents the absolute value of the difference. As a result, the multivalue color image signal M is divided into the binary edge image B of the high-frequency component and the difference multivalue image S of the low-frequency component. The binarization threshold value TH preferably satisfies condition TH>128 (in the case of eight bits). If the threshold value TH is small, a high-frequency component is left in the difference multivalue image.

In this embodiment, a binary edge image is encoded and is perfectly preserved in accordance with entropy encoding, so as to maintain image quality of an edge portion. At the same time, a difference image as a low-frequency component is encoded by multivalue data encoding having high encoding efficiency, thereby performing highly efficient, appropriate encoding.

A binary color image having a small quantity of data, is transmitted in the first step, and only the first-step portion of the transmitted data is decoded on the reception side and is displayed on a monitor. Therefore, the received data can be quickly checked. In addition, if the received data is judged as unnecessary data upon observation of the first-step data, a signal is transmitted to the transmission side to interrupt transmission, thereby preventing unnecessary transmission.

Subsequently, a difference multivalue image is transmitted in the second step, and is decoded on the reception side. The difference multivalue image is added to the binary edge image decoded in the first step, thereby achieving hierarchical encoding for decoding the second hierarchical layer.

The difference multivalue image can be encoded by various known block encoding schemes. In this embodiment, DCT conversion is performed in units of blocks each consisting of 8 pixels×8 pixels, and the conversion coefficients are converted into Huffman codes. In this embodiment, a multivalue image is encoded by a sequential encoding method.

Figure 4:
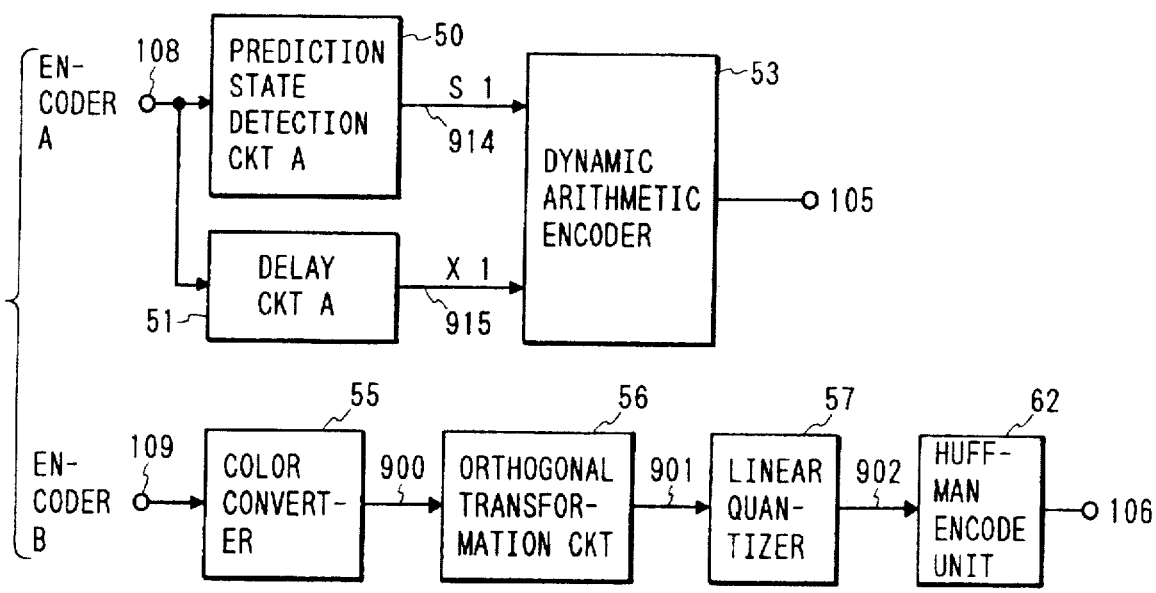
FIG. 4 is a block diagram showing an encoder.

FIG. 4 shows the encoders A 25 and B 26 for difference multivalue images in this embodiment.

R, G, and B signals, of a multivalue image signal 109 read out from the difference memory 24 in FIG. 1, are converted into luminance and color difference signals 900 by a color converter 55. This conversion is generally performed on the basis of the following equations:

$$Y=0.299R+0.587G+0.114B$$

$$Cr=0.713(R-Y)$$

$$Cb=0.564(B-Y)$$

where R, G, B, Y, Cr, and Cb are normalized values.

Figure 5:
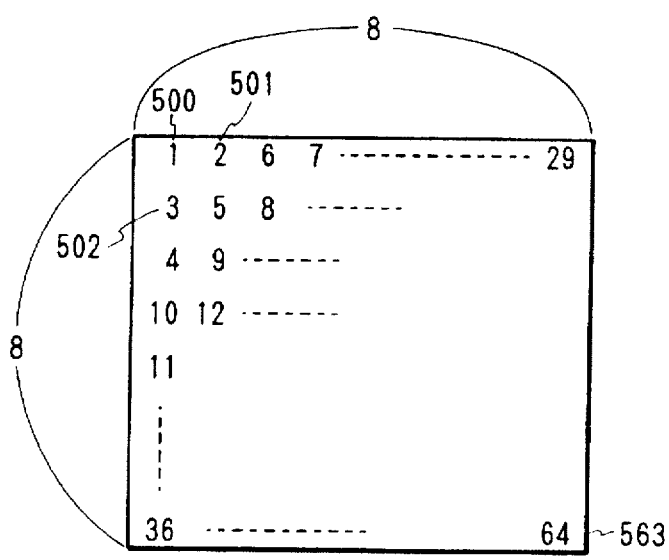
FIG. 5 is a view showing transform coefficients.

An orthogonal transformation circuit 56 transforms an image, given in units of blocks each consisting of 8 pixels×8 pixels into transform coefficients (intensities) given in units of frequencies, in accordance with discrete cosine transform. The transform coefficients shown in FIG. 5 are arranged in an 8×8 matrix and are numbered 1 to 64. A coefficient number 1 represented by reference numeral 500 represents a DC component. Coefficient numbers 2, 3, ... represented by reference numeral 501 and 502, represent AC components. When the number is increased, AC components of higher frequencies are represented.

A transform coefficient signal 901 is quantized into 8-bit data by a linear quantizer 57. This linear quantizer 57 has a large number of quantization steps for DC and low-frequency components, but a small number of quantization steps for a high-frequency component.

A Huffman encode unit 62 independently encodes a DC component (coefficient number 1 of FIG. 5) and AC components (coefficient numbers 2 to 64 of FIG. 5). The DC and AC components are converted into Huffman codes in an order of Y, Cr, and Cb.

A DPCM Huffman code is used for a DC component to assign a Huffman code to a difference between the DC component of the current block and the DC component of the previous block.

The AC components are scanned in a zig-zag manner, as indicated by the coefficient numbers 2 to 64, in units of blocks, and a Huffman code is assigned in accordance with statistic data of a run having a coefficient of 0 and the next coefficient value.

The encoded data 106 is derived from the difference multivalue data, as described above.

In this embodiment, a binary color image having a small quantity of data is encoded in the first step to quickly grasp the image. However, the binary color image in the first step may be hierarchically encoded in the following manner to allow an operator to more efficiently grasp the overall image. More specifically, after the binary image is displayed on the reception-side monitor at a low resolution, the resolution is gradually increased and the image is displayed at higher resolutions. The operator can transmit a transmission interrupt command to the reception side with an operation panel (not shown) while observing the images displayed on the monitor.

Figure 6:
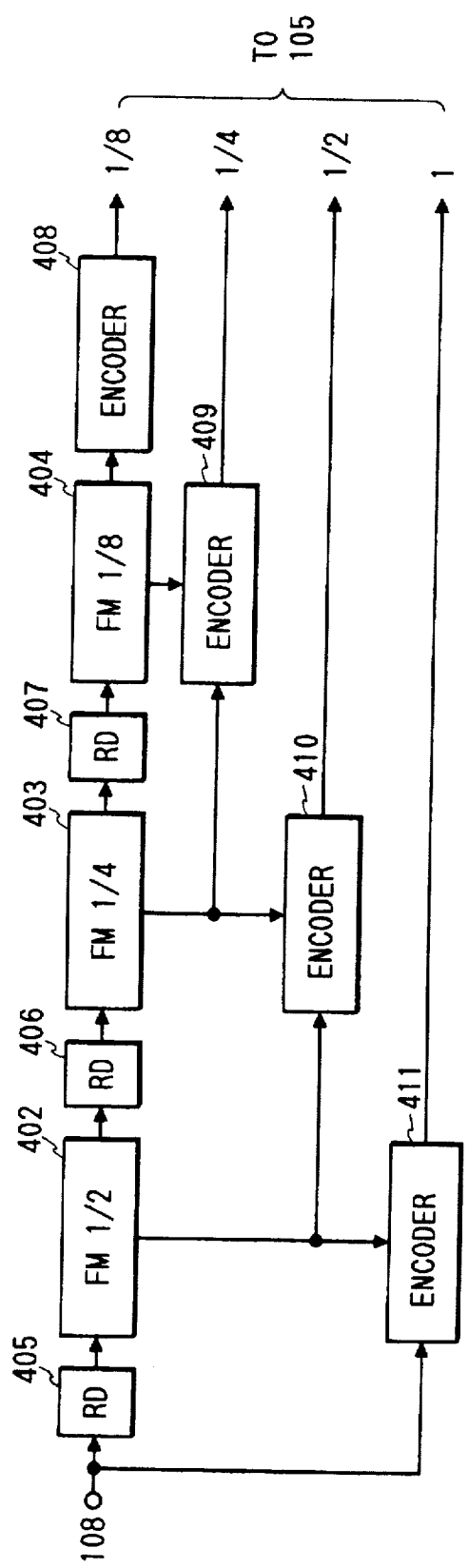
FIG. 6 is a block diagram showing hierarchical encoding.

FIG. 6 shows an arrangement of a hierarchical encoding portion of the binary color image encode unit (i.e., the encoder A 25 in FIG. 1). The circuit illustrated in the block diagram of FIG. 6 is prepared for each color component (i.e., each of the three color components as R, G, and B). Each binary color component image data is input from the binary image memory 22 to the line 108 in FIG. 6.

Frame memories 402 to 404 store ½-, ¼-, and ⅛-reduced images, respectively. Reduction units (RD) 405 to 407 generate ½-, ¼-, and ⅛-reduced images, respectively. Encoders 408 to 411 encode the ⅛-, ¼-, ½-reduced images and a one-to-one image, respectively. Each of the encoders 408 to 411 is constituted by the encoder A in FIG. 4.

The RD 405 reduces an image from the binary image memory 22 into a ½-reduced image by sampling the image into ½ in both main and sub scan directions. The ½-reduced image is stored in the frame memory 402. The ½-reduced image is further reduced by the RD 406 to obtain a ¼-reduced image. The ¼-reduced image is stored in the frame memory 403. Similarly, a ⅛-reduced low-resolution image is formed by the RD 407 and is stored in the frame memory 404.

The encoded data are sequentially transmitted from a low-resolution image, so that the overall image can be roughly grasped.

In the above embodiment, the binary hierarchical encoding has four levels. However, the number of hierarchical levels can be arbitrarily determined.

In the arrangement of FIG. 6, the images are reduced into ½-, ¼-, and ⅛-reduced images in both the main and sub scan directions, and encoding is performed in an order of ⅛-, ¼-, ½-reduced images and a one-to-one image. In encoding of a ⅛-reduced image, the ⅛-reduced images stored in the frame memory 404 are sequentially scanned, and entropy coding such as arithmetic encoding is performed with reference to a pixel of interest to be encoded by the encoder 409 and neighboring pixels. In encoding of a ¼-reduced image, encoding is performed by the encoder 409 with reference to the neighboring pixels of the pixel of interest from the frame memory 404 and the neighboring pixels of the ⅛-reduced image from the frame memory 404, thereby improving encoding efficiency. Similarly, in encoding of a ½-reduced image from the frame memory 402 and a one-to-one image from the frame memory 401 (not shown), they are encoded by the encoders 410 and 411 with reference to the ¼-reduced image from the frame memory 403 and the ½-reduced image from the frame memory 402, respectively.

The binary image hierarchical encoding described above is performed in units of color components, i.e., R, G, and B, and the R, G, and B encoded data of the respective hierarchical levels are sequentially transmitted and are sequentially hierarchically decoded on the reception side. Therefore, color hierarchical encoding which allows the operator to quickly grasp the overall image can be realized.

Figure 7:
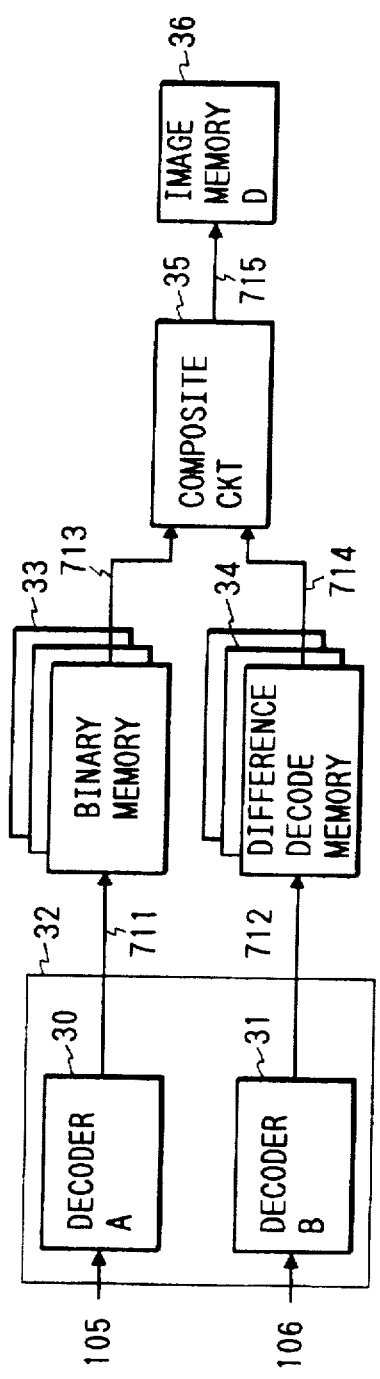
FIG. 7 is a block diagram showing a decode unit.

FIG. 7 shows an arrangement of a decode unit to which the present invention is applied.

The encoded data 105 of the binary color image is decoded into a dot image in units of color components by a decoder A 30. The decoded data are stored in a binary memory 33. This dot image is obtained by perfectly restoring the binary signals stored in the binary image memory 22 in FIG. 1.

The encoded data 106 of the difference multivalue color image is decoded into multivalue image data in units of color components by a decoder B 31. The decoded data are stored in a difference decode memory 34. The data stored in the difference decode memory 34 correspond to the difference multivalue signal stored in the difference memory 24 in FIG. 1.

Figure 14:
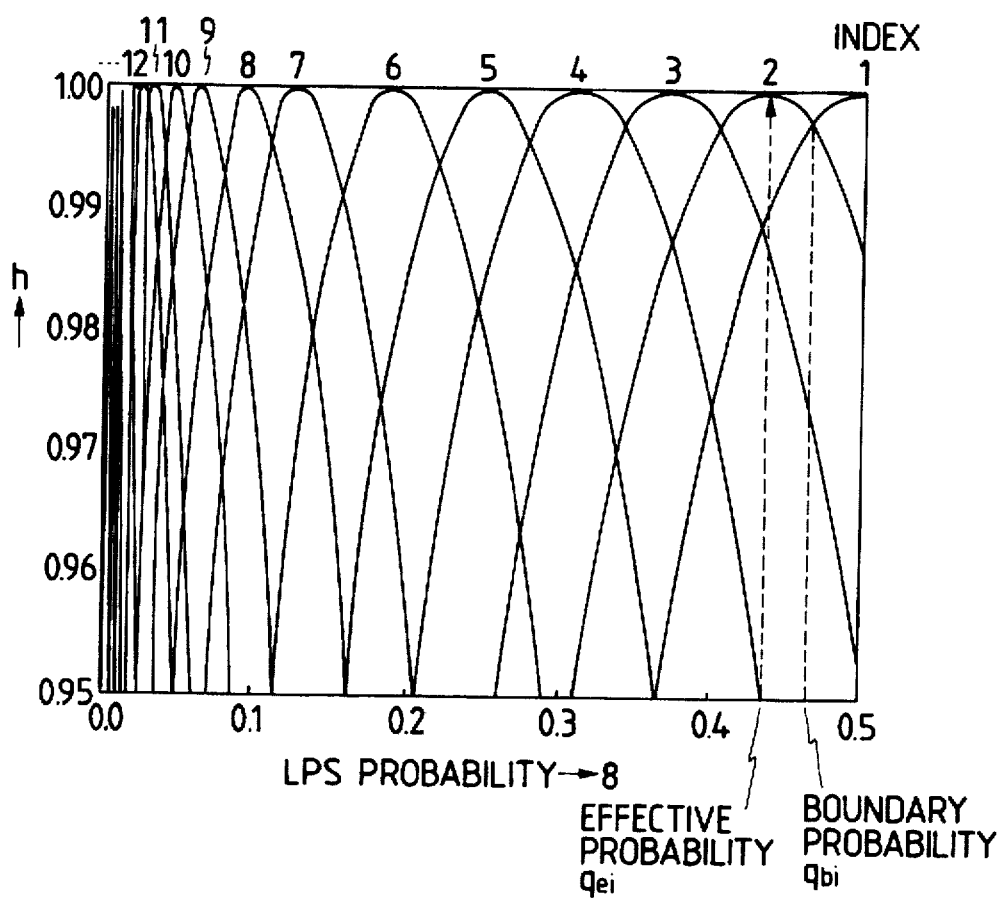
FIG. 14 is a graph showing encoding efficiency curves.

A composite circuit 35 synthesizes an image obtained by level-converting to (0, 255) one-bit R, G, and B signals 713 from the binary memory 33 with a difference signal 714 from the difference decode memory 34 to obtain a signal 715. The signal 715 is stored in an image memory D 36. Image synthesis in the composite circuit 35 is to synthesize the decoded binary edge image (A) with the decoded difference multivalue image (B) to obtain a decoded multivalue color image (C), as shown in FIG. 14. The image data stored in the image memory D 36 is used as display data to be displayed on a monitor or print data.

Figure 8:
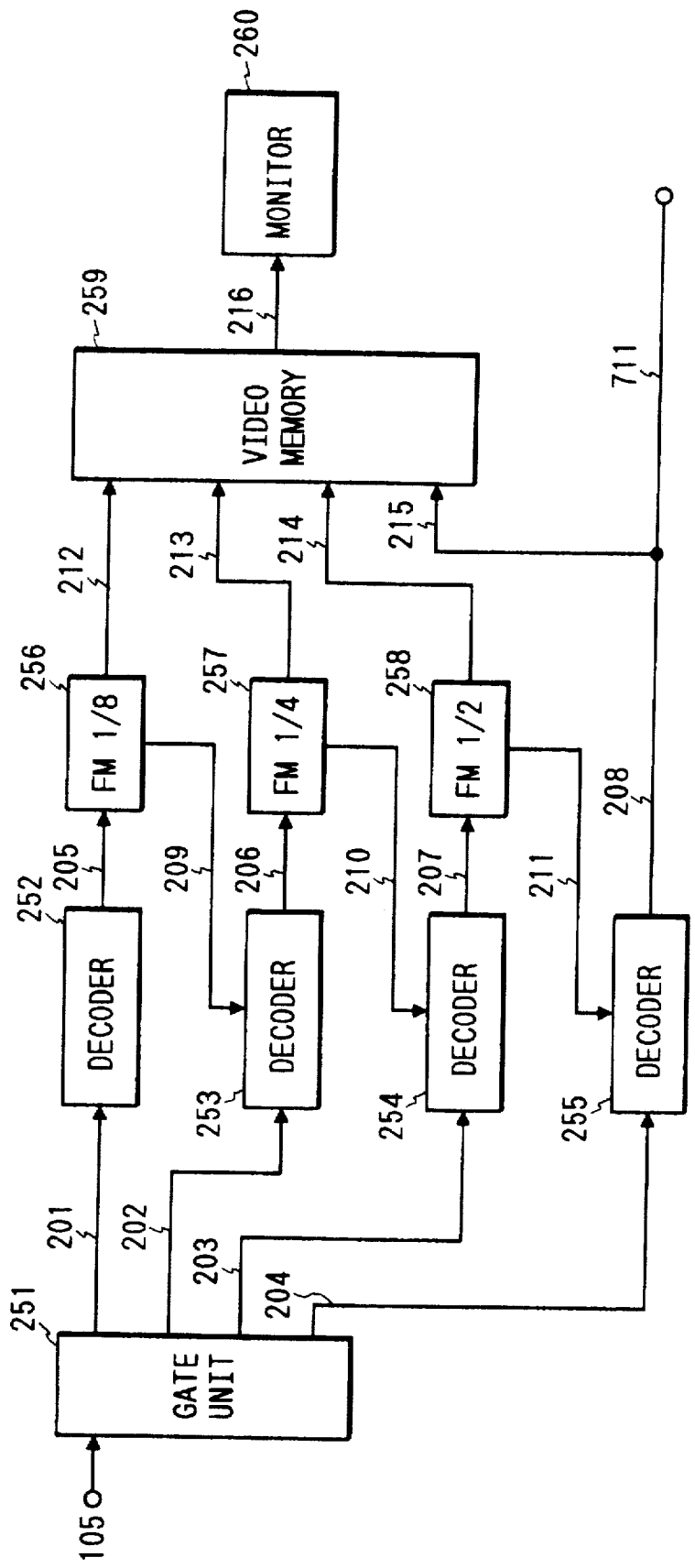
FIG. 8 is a block diagram showing a decode unit.

FIG. 8 is a block diagram of the binary color decoder A 30 shown in FIG. 7 so as to hierarchically decode the encoded data.

The binary color images hierarchically decoded in units of color components (R, G, and B) are input as the encoded data 105. A ⅛-reduced image gated through a gate unit 251, is input to a decoder 252 through a line 201.

The decoded image is stored in a frame memory 256. Similarly, the ¼-reduced image is input from the gate unit 251 to a decoder 253 through a line 202. The ¼-reduced image is decoded by the decoder 253 with reference to the already decoded neighboring pixels and the neighboring pixels of the ⅛-reduced image decoded and stored in the frame memory 256. The decoded image is then stored in a frame memory 257.

Similarly, the ½-reduced image and the one-to-one image (binary original image) are decoded by decoders 254 and 255 in accordance with the neighboring pixels of the ¼- and ½-reduced images and the already decoded neighboring pixels, respectively.

The decoded ½-reduced image is stored in a frame memory 258. The decoded one-to-one image is stored in the binary memory 22 in FIG. 1 through a line 711.

Since the decoded ⅛-, ¼-, and ½-reduced images are hierarchically encoded, the images can be observed on a monitor 260 through a video memory 259. The decoded images can be readily understood. Of all the images hierarchically encoded, since the lowest-resolution image (the ⅛-reduced image in this embodiment) has a minimum data volume and a small size, it can be used as an icon image for retrieving an image. That is, when only this image is decoded during retrieval, the overall image can be readily understood.

The decoder B 31 can be easily operated by performing conversion opposite to that of the encoder B in FIG. 4. That is, Huffman codes of DC and AC components are decoded, and the DCT coefficients are constituted in units of blocks each consisting of 8 pixels×8 pixels. DCT conversion is then performed to easily achieve decoding in the decoder B 31.

Dynamic arithmetic encoding is used as binary image encoding, and its details will be described below. The encoder A in FIG. 4 is a detailed arrangement of each of the encoders 409, 410, and 411 in FIG. 6. The encoders 409, 410, and 411 have identical operations, and only the operation of the encoder 411 will be represented.

Binary data of an image to be encoded is input from the binary memory 22 to a prediction state detection circuit 50 in FIG. 4 through the line 108. The ½-reduced encoded image from the frame memory 402 in FIG. 6 is simultaneously supplied to the prediction state detection circuit 50.

The prediction state detection circuit 50 outputs a prediction state signal S 914 constituted by encoded neighboring pixels including the reduced image with respect to the pixel of interest. The prediction state detection circuit 50 also outputs encoded pixel data X 915 synchronized with a signal S 116. These output signals are input to and encoded by a dynamic arithmetic encoder 53.

Figure 9:
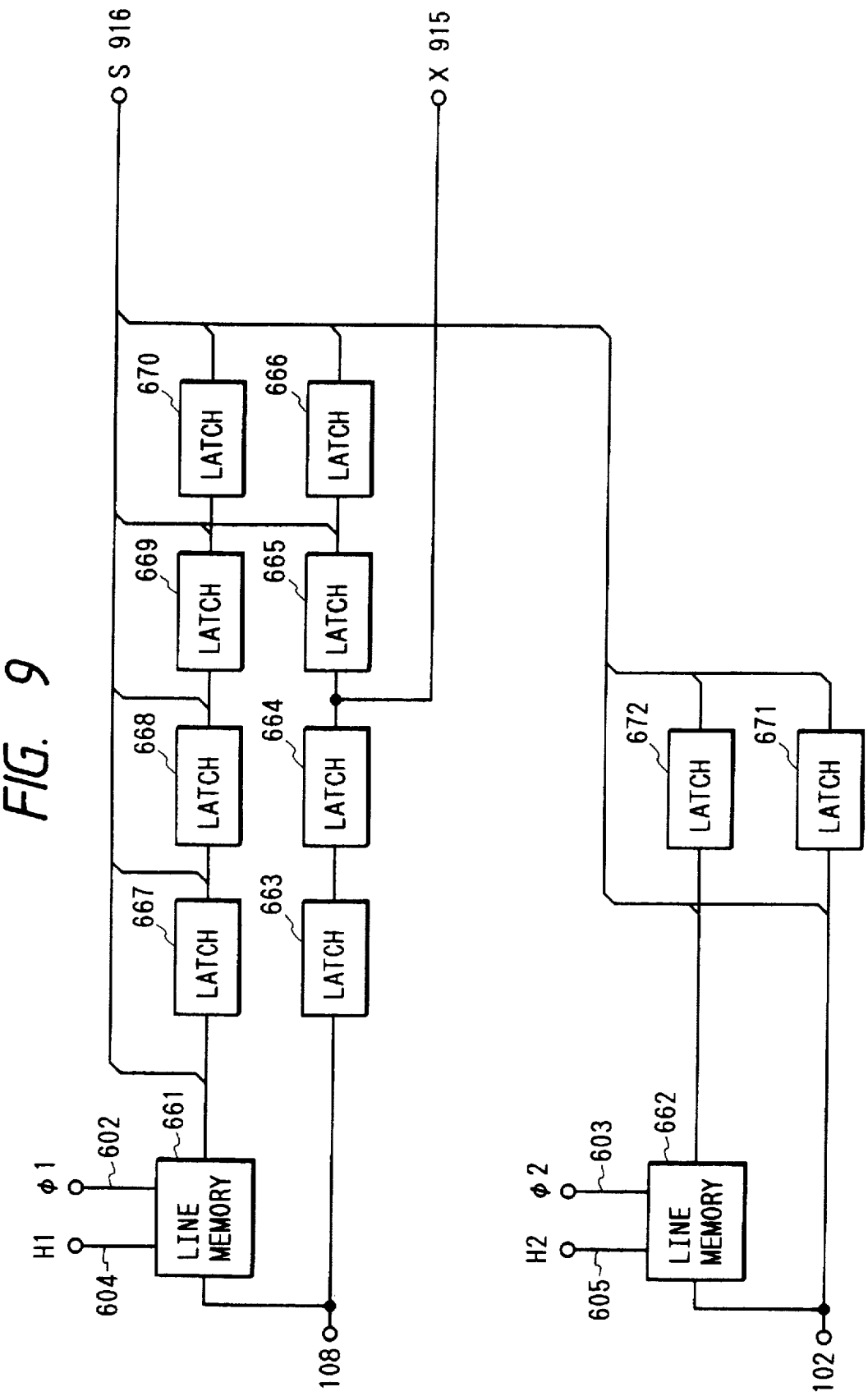
FIG. 9 is a block diagram showing a reference pixel.

FIG. 9 is a block diagram of the prediction state detection circuit 50. An encode image and a reduced image are input to the lines 108 and 102, respectively. The encode image is an image to be encoded by binary image hierarchical encoding, and the reduced image is an encoded ½-reduced image of the encode image.

A line memory 661 stores a pixel state to refer to a line immediately preceding an encode pixel. A line memory 662 stores a line immediately preceding a line corresponding to the encoded pixel in the reduced image.

Latches 663 to 670 store states of the neighboring pixels of the encode pixel, and latches 671 and 672 store states of the neighboring pixels of the reduced image. The encode image and the reduced image are shifted in the line memories and the latches in response to pixel clocks φ1 (602) and φ2 (603), respectively.

The encode image and the reduced image are line-controlled in response to horizontal sync signals H1 (604) and H2 (605), respectively. Since the reduced image has a length and width ½ those of the encode image, the pixel clock frequency and the horizontal sync frequency are controlled by the following relations:

φ1=2φ2

H1=2H2

The encode pixel represents a pixel value stored in the latch 664 and is input to the dynamic arithmetic encoder 53 in FIG. 4, by means of the signal X 915, and is encoded.

At this time, outputs from the line memory 661, and the latches 665 to 670 for seven neighboring pixels of the encode pixel, are referred to as the states of neighboring pixels required for encoding.

In the reduced pixels, pixel values as outputs from the line memory 662 and the latches 671 and 672, i.e., a total of four pixel values which are at the same pixel position as a pixel value 201 of a reduced pixel position corresponding to the encode pixel position, are referred to.

The states of a total of eleven reference pixels are input to the dynamic arithmetic encoder 53, by means of the signal S 916, to predict the states.

Figure 10A:
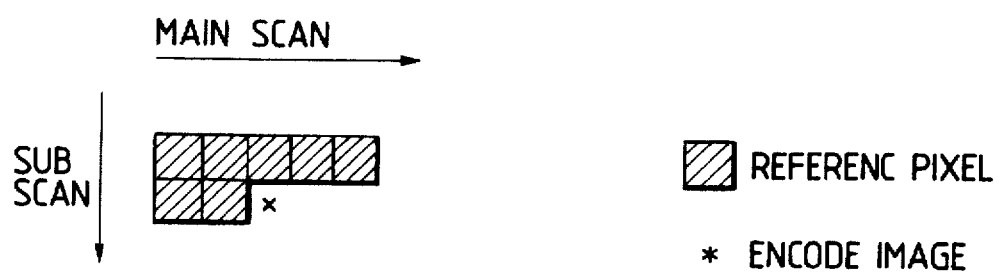
FIG. 10A is a view showing a reference pixel of an encoded image.
Figure 10B:
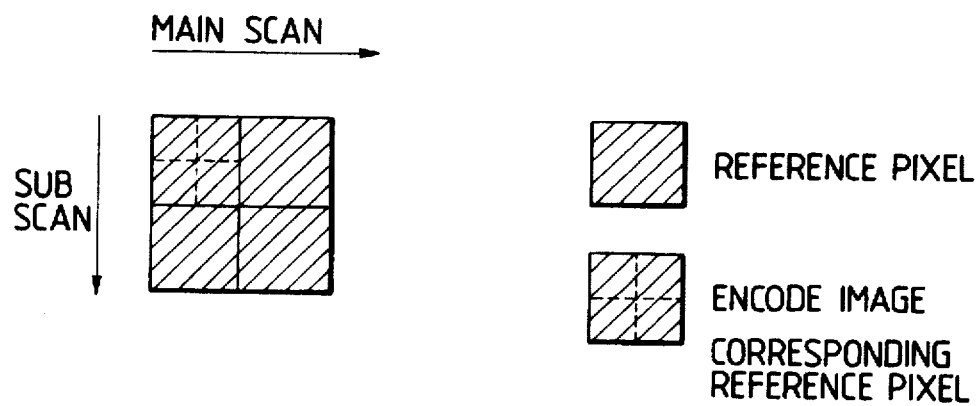
FIG. 10B is a view showing a reference image of a reduced image.

FIGS. 10A and 10B are views showing neighboring reference pixels for state prediction. Seven and four neighboring pixels are referred to for the encode and reduced images, respectively. One reference pixel in a reduced image corresponds to four reference pixels in the encode image.

Figure 11:
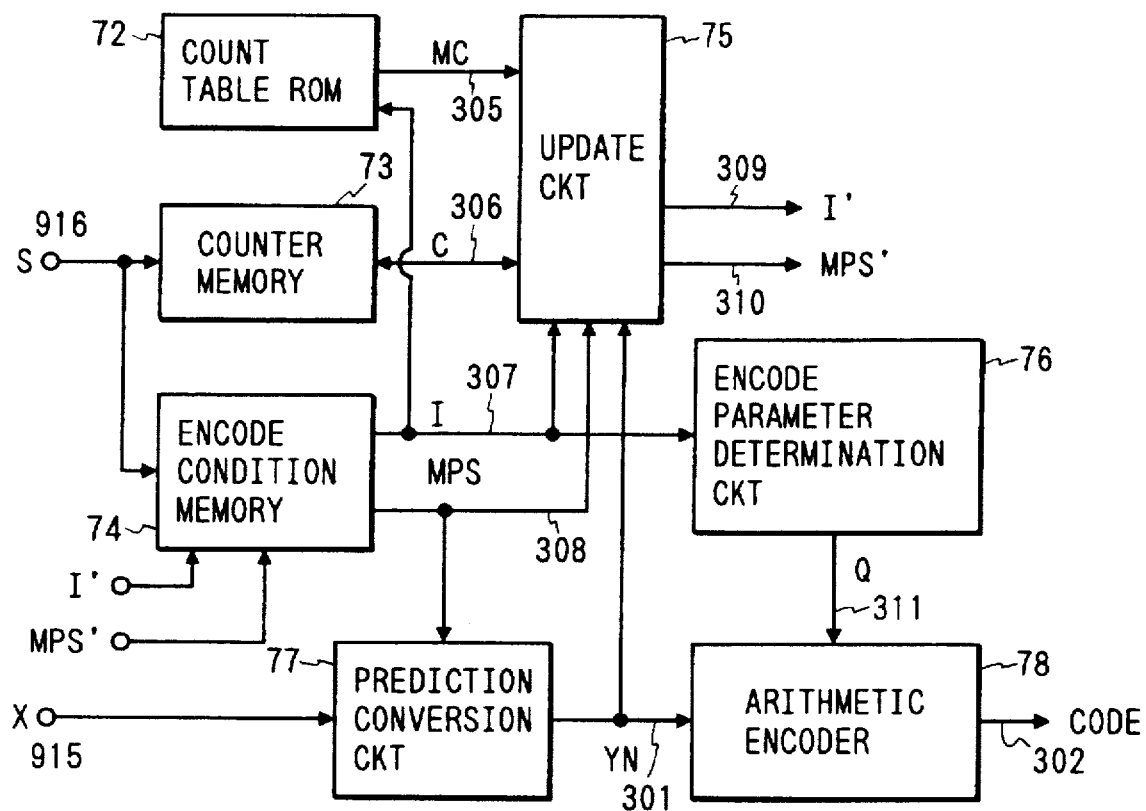
FIG. 11 is a block diagram of an encoder.

FIG. 11 is a block diagram of the dynamic arithmetic encoder 53 in FIG. 4.

Arithmetic encoding used in this embodiment will be described prior to a description with reference to FIG. 11.

As is well known, arithmetic encoding is a method of forming a code by arithmetic operations such that an input signal string becomes a code represented by a binary decimal fraction. This method is already proposed by Langdon and Rissanen, "Compression of Black/White Images With Arithmetic Coding", IEEE Trans. Com. COM-29, 6 (June, 1981). According to this literature, the following arithmetic operations are performed for each input signal when an encoded input signal is defined as S, a probability for causing a least probable symbol (LPS) is defined as q, an operation register Augend is defined as A(S), and a code register is defined as C(S):

$$A(S1) = A(S) \times q \equiv A(S) \times 2^{-Q} \qquad (1)$$

$$A(S0) = <A(S) - A(S1)>_1 \qquad (2)$$

where $<\ >_1$ represents discretization to obtain one significant bit.

$$C(S0) = C(S) \qquad (3)$$

$$C(S1) = C(S) + A(S0) \qquad (4)$$

If encode data represents a most probable symbol (MPS: 0 in this case), A(S0) and C(S0) are used for encoding the next data. However, if the encode data represents a least probable symbol (LPS: 1 in this case), A(S1) and C(S1) are used for encoding the next data.

A new A value is multiplied with $2^S$ (S is an integer of 0 or more) and set to fall within the range of $0.5 \leq A < 1.0$. This processing in hardware corresponds in that the operation register A is shifted S times. The code register C is also shifted S times, so that a signal shifted out can serve as a code. The above operations are repeated to form a code.

As represented by equation (1), by approximating the appearance probability q of the LPS by a power of 2 ($2^{-Q}$ where Q is a positive integer), the multiplication operations are substituted with shift operations. In order to maximize this approximation, for example, q is approximated by a polynomial with powers of 2, as represented in equation (5):

$$q \equiv 2^{-Q1} + 2^{-Q2} \qquad (5)$$

Since the Q value can be changed for every encode data in arithmetic encoding, a probability determination portion may be separated from an encoding portion.

In this embodiment, a dynamic encoding method in which a probability is obtained during encoding is performed.

The block diagram of the encoder 53 (FIG. 4) for performing arithmetic encoding will be described.

The state signal S 916, from the prediction state detection circuit 50 in FIG. 4, is input to a counter memory 73 and an encode condition memory 74.

The encode condition memory 74 stores a most probable symbol (MPS) 308, which tends to appear in each state represented by the state signal S 916, and an index I 307, representing an encode condition including an appearance probability of the LPS in arithmetic encoding (to be described later).

The MPS 308 read out from the encode condition memory 74, in accordance with the color and state of an image to be encoded, is input to a prediction conversion circuit 77. The prediction conversion circuit 77 generates a YN signal 301 which is set at "0" when a serial pixel signal X 117 from the prediction state detection circuit 50 in FIG. 4 coincides with the MPS 308.

The YN signal 301 is input to an update circuit 75. When the YN signal is set at "0", the update circuit 75 increments a corresponding one of the count values stored in the counter memory 73.

If a count value C 306 stored in the counter memory 73 coincides with a preset value MC 305 from a count table ROM 72, the update circuit 75 updates the count to increase the index I 307 (i.e., in a direction to reduce the appearance probability q of the LPS) (in this case, the MPS is not inverted).

Note that the count table ROM 72 supplies, to the update circuit 75, the MPS count MC 305 (FIG. 17) determined in corresponding to the index I representing the appearance probability q of the LPS.

When the MPS 308 does not coincide with the pixel signal X 117, i.e., when the YN signal from the prediction conversion circuit 77 is set at "1", the update circuit 75 reduces the count value to decrease the index I 307 (i.e., in a direction to increase the appearance probability q of the LPS). When a YN signal of level "0" is received in an index state of "1", the MPS is inverted (0→1 or 1→0).

Outputs I' 309 and MPS' 310 from the update circuit 75 represent updated index values. These values are stored in the encode condition memory 74 again.

An encode parameter determination circuit 76 sets an encode parameter Q 311 of arithmetic encoding, in an arithmetic encoder 78, on the basis of the value of the index I 307. The arithmetic encoder 78 performs arithmetic encoding of the YN signal 301 from the prediction conversion circuit 77 by using the parameter Q 311, thereby obtaining a code 302.

Static encoding can be easily performed by not updating the values I and MPS while an initial value is supplied to the encode condition memory 74.

Figure 12:
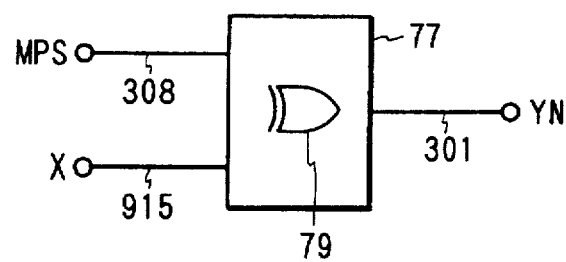
FIG. 12 is a block diagram of a prediction transformation circuit.

FIG. 12 is a block diagram of the prediction conversion circuit 77. The serial pixel signal X 915 and the MPS 308 are input to an EX-OR gate 79. When the serial pixel signal X 915 coincides with the MPS 308 in accordance with the truth table in FIG. 18, a YN signal 301 of level "0" is output from the EX-OR gate 79. Otherwise, a YN signal 301 of level "1" is output from the EX-OR gate 79.

Figure 13:
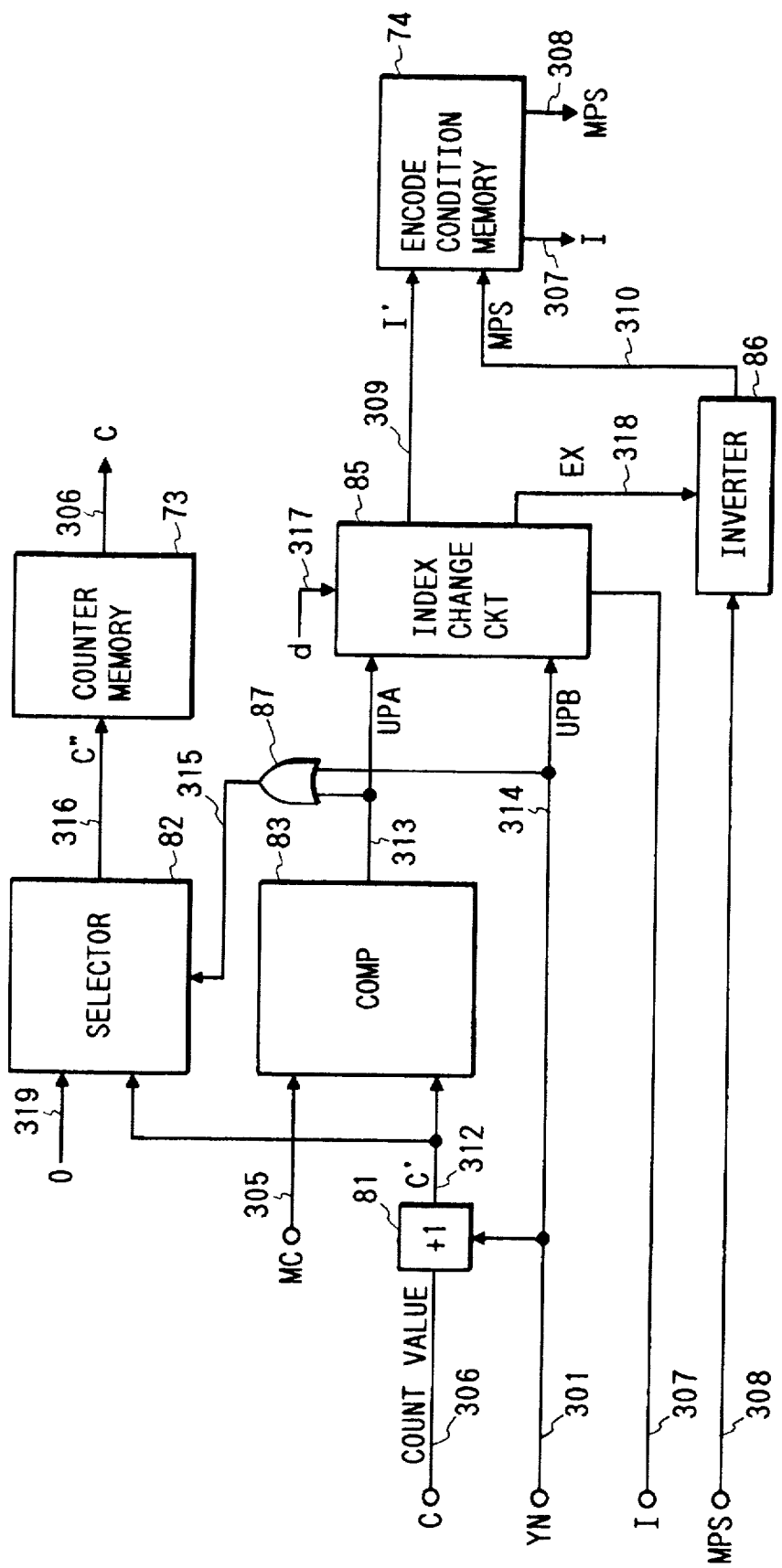
FIG. 13 is a block diagram of an update circuit.

FIG. 13 is a block diagram of the update circuit 75. When the YN signal 301 is set at "0", the count value C 306 from the counter memory 73 is incremented by one by an adder 81, thereby obtaining a signal C' 312. This signal value is compared with the MC 305 from the count table ROM 72 by a comparator 83. If the value C' coincides with the value MC, an update signal UPA 313 is set to be "1".

The YN signal 301 serves as an update signal UPB 314. The signals UPA and UPB are input to an index change circuit 85. The signals UPA and UPB are logically ORed by an OR gate 87. An output signal 315, from the OR gate 87, serves as a switching signal for a selector 82.

When the signal 315 is set at "1", the selector 82 selects a 0 signal 319 for resetting the value of the counter memory 73. Otherwise, the selector 82 selects the output signal C' 312, from the adder 81, and outputs it as a counter update signal C" 316. The signal C" 316 is stored in the counter memory 73. Therefore, when the serial pixel signal X 115 does not coincide with the MPS 308 and this non-coincident state continues a predetermined number of times, the count value of the counter memory 73 is reset.

The index change circuit 85 receives a signal d 317 (normally d=1) for controlling index update steps, the update signals UPA 313 and UPB 314, and the present index I 307 from the encode condition memory 74.

FIG. 19 is a table showing an index update method in the index change circuit 85 (the update steps in FIG. 19 are given as d=1 and d=2). A present index I, an update step condition d, UPA, and UPB are I referred to in this table to obtain an updated index I'.

If I=1 and UPB=1 (i.e., the serial pixel signal X 115 does coincide with the MPS 308), an EX signal 318 is set.

When the EX signal 318 is set at "1", an inverter 86 inverts the symbol of the present MPS 308 (0→1 or 0→1) to obtain an updated MPS' 310. However, if the EX signal is set at "0", the MPS' is not changed. The updated I' 309 and the updated MPS' 310 are stored in the encode condition memory 74 and are used as index I and the MPS of the next processing.

Note that the update method shown in FIG. 19 may be realized by a table constituted by a ROM or a logic circuit using an adder and a subtracter.

As described above, when MPSs corresponding to the number of MPSs determined in accordance with the value of the index I representing the appearance probability q of the LPS approximated with the polynomial of powers of 2 appear, d is added to the index I to reduce the appearance probability q of the LPS used for arithmetic encoding. However, when an LPS is generated, the index I is reduced by d to increase the appearance probability q of the LPS used for arithmetic encoding. In addition, if an LPS appears in a state wherein the appearance probability q of the LPS represents 0.5 (i.e., the index I is set at "1"), the MPS is inverted.

Arithmetic encoding with high encoding efficiency can be achieved by adaptively updating the index I and the MPS for the input image.

FIG. 14 shows encoding efficiency curves in arithmetic encoding used in this embodiment. A value of the index I is represented by its lower case i hereinafter. The curves can be represented by equation (6) when the appearance probability of the LPS is defined as q and the approximated probability at the time of encoding is defined as $q_{ei}$. Indices I (1, 2, 3, ....) are assigned to the values of the appearance probabilities q of the LPSs from the larger values to the smaller values:

$$\eta = \frac{-q\log_2 q - (1-q)\log_2(1-q)}{-q\log_2 q_{ei} - (1-q)\log_2(1-q_{ei})} \quad (6)$$

where the numerator of equation (6) represents an entropy, and $q_{ei}$ is a value represented by equation (7) below:

$$q_{ei} = q_1 + q_2 \quad (7)$$

The values of the terms $q_1$ and $q_2$ are given by polynomial values of the powers of 2, as indicated in FIG. 20 and are exemplified as follows:

$$q_{e1}' = 2^{-1} \quad (8)$$

$$q_{e2}' = 2^{-1-2-4} \quad (9)$$

$$q_{e3}' = 2^{-1+2-3} \quad (10)$$

The value $e_{ei}$ for obtaining as a peak value (1.0) of the efficiency η in this probability is called an effective probability. An intersection between the efficiency curves is called a boundary probability $q_{bi}$. Efficient encoding can be apparently performed using an effective probability next to the boundary probability.

In this embodiment, the effective probability $q_{ei}$ shown in FIG. 20 is selected from probabilities approximated by the two terms of equation (5). $Q_1$, $Q_2$, and $Q_3$ in FIG. 20 are parameters $Q_c$ 311 supplied to the arithmetic encoder 78. More specifically, the parameters $Q_1$ and $Q_2$ are shift amounts supplied to the shift register. By these two shift operations, a power of 2 is calculated. The parameter $Q_3$ represents a coefficient of the second term and switches between positive and negative signs.

MC values in FIG. 17 are determined as follows.

If the number of LPSs is defined as $N_L$ and the number of MPSs is defined as $N_M$, the appearance probability of the LPS is given by equation (11) below:

$$q = \frac{N_L}{N_M + N_L} \quad (11)$$

This equation is solved with respect to $N_M$ to derive equation (12) below:

$$N_M = \lfloor N_L(1/q - 1) \rfloor \quad (12)$$

where $\lfloor x \rfloor$ represents rounding of the decimal part. A substitution of $q_{bi}$ in FIG. 11 into q in equation (12) yields the number $N_{mi}$ of the most probable symbols (MPS). Therefore, the MC can be calculated in accordance with equation (13):

$$MC_i = N_{Mi+1} - N_{Mi} \quad (13)$$

The MC values in FIG. 17 are obtained from equations (11), (12), and (13) for $N_L=2$.

As shown in FIG. 14, the number Nmi of the most probable symbols (MPS) corresponding to the indices I are obtained on the basis of the boundary probabilities $q_{bi}$, and a difference in $N_M$ between the adjacent indices is defined as MC corresponding to each index I.

The MC value is compared with the number of most probable symbols (MPS) as described above. If a coincidence between the MC value and the MPS count is found, this state is determined as a state in which encoding using the next index I is suitable. In this case, the index I is updated. The index I can be updated at an appropriate timing on the basis of the number of MPSs, and at the same time, encoding using an optimal index can be adaptively performed.

Figure 15:
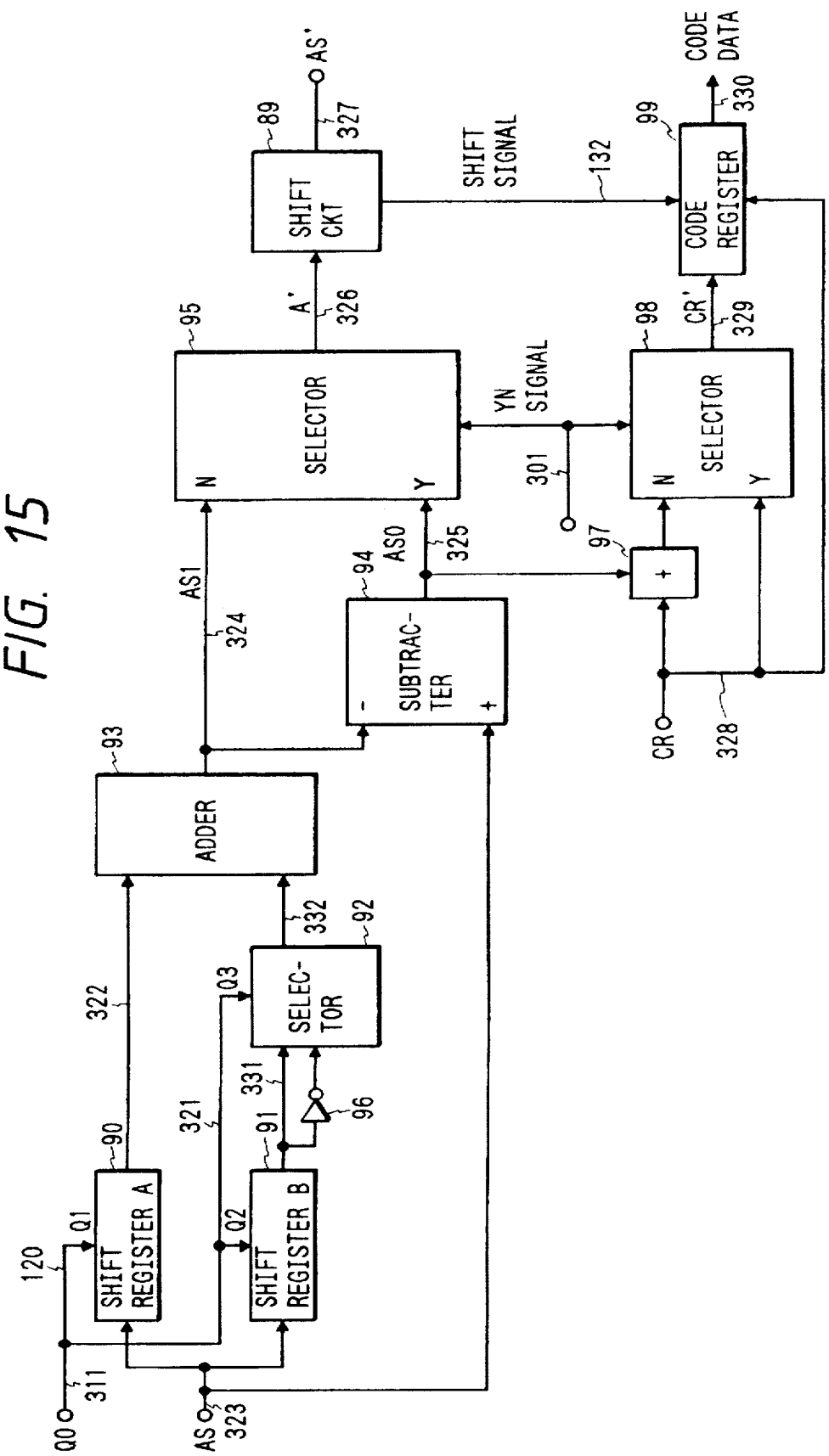
FIG. 15 is a block diagram of an arithmetic encoder.
Figure 16:
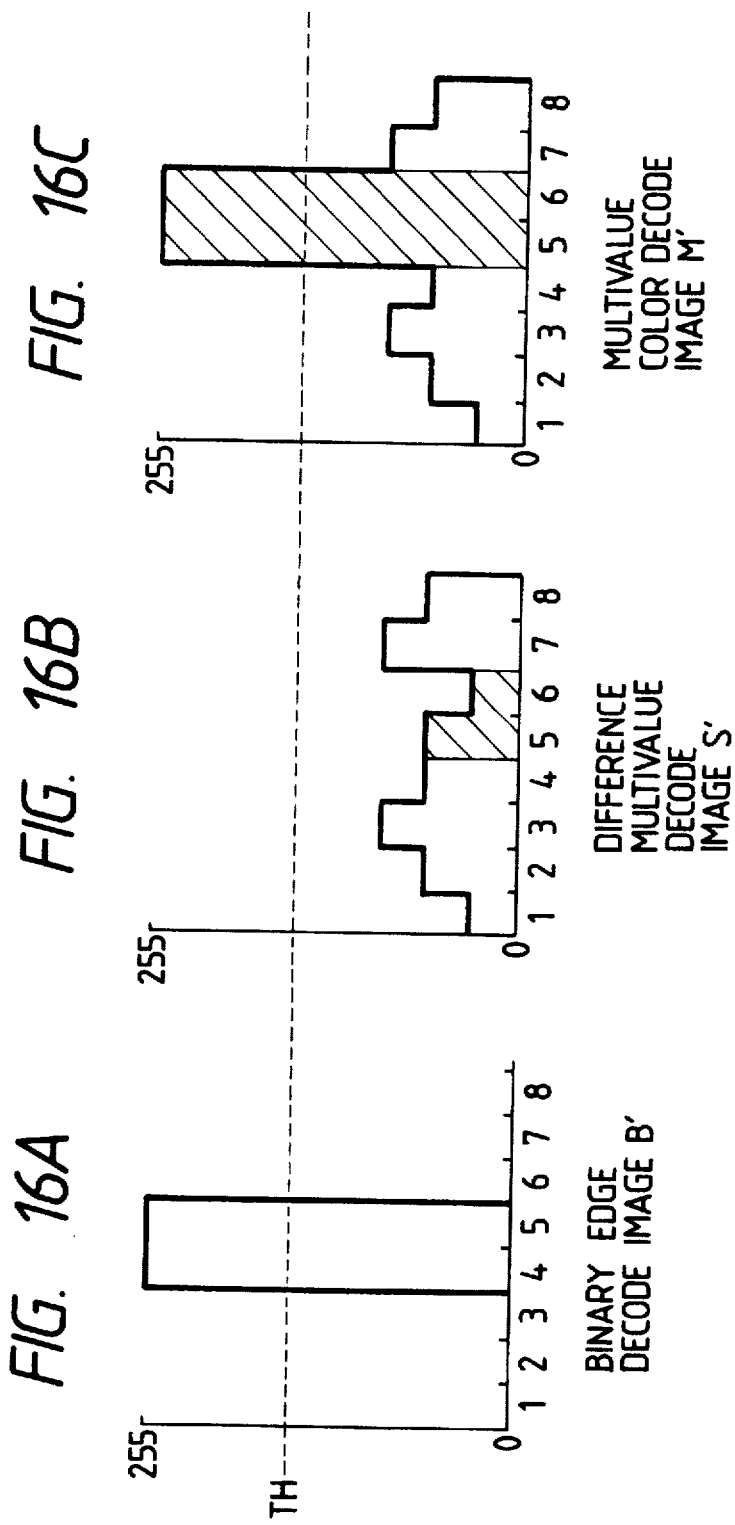
FIGS. 16A to 16C are views showing a decoding operation.

FIG. 15 is a block diagram of the arithmetic encoder 78.

Of all control signals Q 311 (FIG. 20) determined by the encode parameter determination circuit 76, a signal $Q_1$ is input to a shift register A 90, a signal $Q_2$ is input to a shift register B 91, and a signal $Q_3$ is input to a selector 92. The signals $Q_1$ and $Q_2$ designate the number of bits for shifting the Augend signal in the shift registers A and B in the right direction. The shift results are output signals 322 and 331.

The complementary value of the signal 331 is calculated by an inverter 96. The selector 92 selects the signal 331 derived from the control signal $Q_3$ or an output signal from the inverter 96, thereby obtaining an output signal 332.

An adder 93 adds the signal 322 from the shift register A 90 and the signal 332 from the selector 92 and outputs an $A_{S1}$ signal 324. A subtracter 94 subtracts the $A_{S1}$ signal 324 from an As signal 323 to obtain an $A_{S0}$ signal 325.

A selector 95 selects one of the $A_{S0}$ and $A_{S1}$ signals 325 and 324 in accordance with the YN signal 301. More specifically, when the YN signal is set at "1", the $A_{S0}$ signal is selected as an A' signal 326. However, when the YN signal is set at "0", the $A_{S1}$ signal is selected as the A' signal 326.

The left shift operation continues in a shift circuit 89 until the MSE of the A' signal 326 becomes "1", thereby obtaining an A'$_S$ signal 327. A shift signal 332 representing this shift count is input to a code register 99. The code register 99 outputs the number of bits corresponding to the shift count, thereby obtaining code data 330.

The code data 330 is processed so that a finite number of "1"s continue in accordance with a bit processing method (not shown) The processed data is transmitted to the decoder.

A content CR 328 of the code register 99 is added to the A$_{S0}$ signal 325 by an adder 97, and a sum is input to a selector 98. A signal CR 328 not added to the A$_{S0}$ signal 325 is also input to the selector 98. If the YN signal 301 is set at "1", a CR' signal 329 satisfying CR'=CR is output. However, if the YN signal 301 is set at "0", a CR' signal 329 satisfying CR'=CR+A$_{S0}$ is output. The shift operation of the CR' signal in the code register 99 is also performed.

As described above, according to the present invention, if a multivalue color signal represents an edge portion is determined for each block. Blocks determined as edge portions are binarized, and entropy encoding is performed. Therefore, a sharp binary color image representing an edge portion such as a character or a line can be encoded at a high compression ratio so as to almost eliminate degradation of image quality. As for a multivalue color signal having a small number of edge portions such as a color photograph, low-frequency components from which edge portions are omitted are encoded. Therefore, encoding at a high compression ratio can be performed in this case as well.

A binary color image representing an edge portion is hierarchically encoded to allow encoding of an image which is almost free from image degradation and the edge portion of which is preserved, although the quantity of data is small, thereby allowing immediate grasping of the overall image.

(Second Embodiment)

Figure 21:
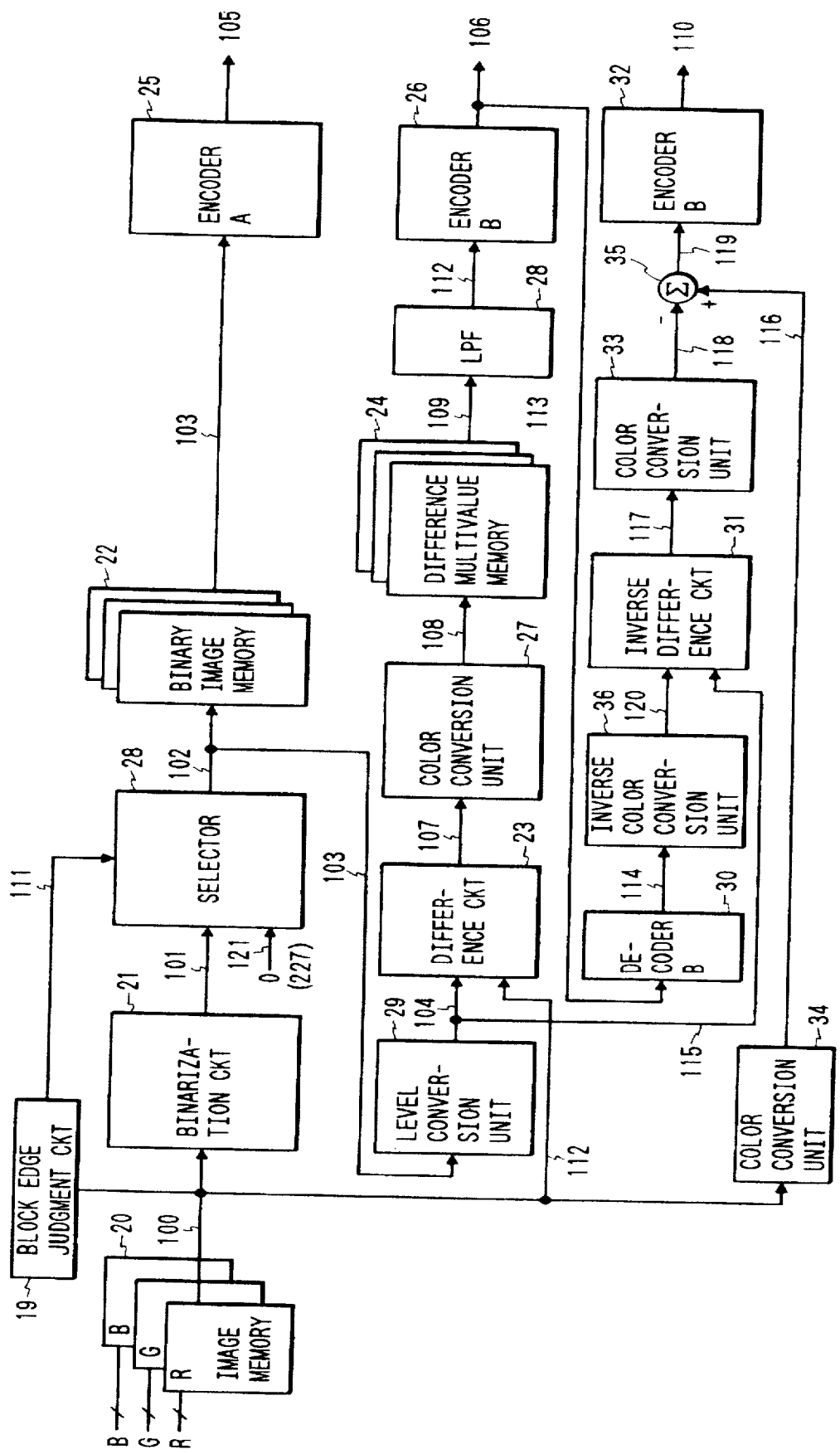
FIG. 21 is a block diagram of an encode unit.

FIG. 21 shows an arrangement of an encode unit to which the present invention is applied.

8-bit multivalue color image signals, i.e., red (R), green (G), and blue (B) image signals representing a full-color image input from a color still image input means such as a color scanner (not shown) or the like are stored in an image memory 20.

A multivalue color image signal 100 read out from the image memory 20 is subjected to binarization processing in a binarization circuit 21 in units of colors and is converted into one-bit R, G, and B color signals.

A block edge judgment circuit 19 judges whether each block of the multivalue color image signal 100 is an edge portion. In this embodiment, one block consists of 8 pixels×8 pixels and is judged to be an edge or non-edge portion.

The signals binarized by the binarization circuit 21 are masked by a selector 28 in accordance with a mask signal 121 in units of blocks.

A block judgment signal 111 selects a binarization signal 101 for a block judged as an edge portion by the block edge detection circuit 19. The mask signal 0 is selected for a block judged as a non-edge portion. Therefore, only an edge image of the binarization images is stored in a binary image memory 22 through a line 102 in units of colors.

A binary color signal read out from the binary image memory 22 is encoded by an encoder A for encoding a binary color image. An encoded word 105 is output from the encoder A. Encoding processing by this encoder A is the first encoding processing.

The same color image signal subjected to the first encoding processing is read out from the image memory 20.

This color signal is used to encode a portion except for the binary edge image encoded by the first encoding processing.

The binary edge image is input from a selector 28 to a level conversion unit 29. The binary signal is level-converted into an 8-bit signal representing one of values, 0, 1, ..., 255.

A difference circuit 23 calculates a difference between a level-converted binary image 104 and a multivalue color image 112, thereby obtaining a difference multivalue RGB signal 107.

A color conversion unit 27 converts the RGB signal into a signal (luminance and color difference signals) 108. This conversion is generally performed on the basis of the following equations:

$$Y=0.299R+0.587G+0.114B$$

$$Cr=0.713(R-Y)$$

$$Cb=0.564(B-Y)$$

where R, G, B, Y, Cr, and Cb are normalized values.

The color-converted difference multivalue YCrCb signal 108 is stored in a difference multivalue memory 24 and is then encoded.

In this embodiment, the difference multivalue YCrCb signal 108 is further hierarchically encoded. The difference multivalue YCrCb signal is smoothed by a low-pass filter 28 and is encoded by an encoder B 26.

The low-pass filter 28 uses, e.g., filter coefficients shown in FIG. 22. Each coefficient in practical filtering is a normalized coefficient, i.e., a ⅟₃₆ coefficient.

Encoding processing by the encoder B 26 is second encoding processing to produce an encoded word 106. The second encoded word 106 is decoded by a decoder B 30 for performing an inverse conversion to the encoder B 26 due to hierarchical encoding processing, thereby obtaining a decoded difference multivalue YCrCb signal 114.

The difference multivalue RGB signal can be decoded by an inverse color conversion unit 36. This conversion is performed on the basis of the inverse conversion of equation (1).

An inverse-converted difference multivalue RGB signal 120 is decoded by an inverse difference circuit 31 into a compressed image in which the difference multivalue RGB signal 120 is synthesized with the binary color signal 115. This image is obtained such that the first encoded word 105 and the second encoded word 106 are restored as a hierarchical RGB image.

A decoded RGB image 117 is converted into a decoded YCrCb image 118 by a color conversion unit 33. This conversion is performed in accordance with equation (1).

On the other hand, the original image signal 100 stored in the image memory 20 is also color-converted into a YCrCb original image signal 116 by a color conversion unit 34.

The decoded YCrCb difference image signal 118 is subtracted from the YCrCb original image signal 116 by a subtracter 35 to produce an original difference image signal 119. Third encoding processing is then performed by an encoder B 32 to obtain a third encoded word 110.

The encoders B 32 and B 26 perform the same encoding processing. The third encoding processing is third hierarchical encoding for obtaining a difference between an original image and the first and second encoding processing results.

The block edge judgment circuit 19 is the same as that shown in FIG. 1, and a detailed description thereof will be omitted.

A relationship between a multivalue color image signal M read out from the image memory 20, a binary edge image B, and a difference multivalue image S is the same as that in FIG. 4.

A difference scheme in this embodiment is applied to the difference circuit 23 in FIG. 21. The inverse difference circuit 31 in FIG. 21 performs processing opposite to difference absolute value processing, i.e., M=|S−B|, thereby decoding the multivalue color image signal.

FIG. 23 shows an arrangement of a decoding unit to which the present invention is applied.

The binary color image encoded word 105 is decoded into a dot image by a decoder A 40 in units of color components, and the dot image is stored in a binary memory 43. This dot image perfectly corresponds to the binary signal stored in the binary image memory 22 in FIG. 21.

The decoded data forms a binary image 150 of the first hierarchical level.

The encoded word 106 of the difference multicolor image of the second hierarchical level is decoded into a component YCrCb signal by a decoder B 41.

The YCrCb signal is converted into an RGB signal by an inverse color conversion unit 44 through a line 154. A difference between an RGB difference signal 155 and the binary image 150 of the first hierarchical layer stored in the binary memory 43 is calculated by an inverse difference unit 46 to form a multivalue decoded image 151 of the second hierarchical level.

The encoded word 110 of a difference multivalue color image of the third hierarchical level is also decoded into a YCrCb signal by a decoder B 42.

A difference signal 157 from the decoder B 42 is added by an adder 48 to a signal obtained such that the decoded signal 151 of the second hierarchical level is converted into the component signal YCrCb by a color conversion unit 45. The sum signal serves as the decoded signal of the third hierarchical level. This YCrCb signal is converted into an RGB signal by an inverse conversion unit 47, thereby obtaining a decoded signal 152 of the third hierarchical level.

In this embodiment, the following hierarchical encoding can be performed. More specifically, a binary color image which is obtained by extracting features (edges) of an image but which has a small quantity of data is encoded by perfect decoding type entropy encoding and is then transmitted in the first step. The receiving side decodes only the first-step portion of the data and displays the decoded content to allow the operator to immediately grasp the overall image with relatively high quality.

In the second step, the original image and the binary color difference multivalue image are converted into an image consisting of only low-frequency components by smoothing processing, and compression efficiency can be improved by using DCT Huffman encoding for efficiently encoding a low-frequency image.

In the third step, a difference multivalue image between the original image and the second-step image is encoded in accordance with DCT Huffman encoding at a desired compression ratio with good image quality.

The difference multivalue image of this embodiment can be encoded by various known block encoding schemes. In this embodiment, the image is DCT-converted in units of blocks each consisting of 8 pixels×8 pixels, and the conversion coefficients are Huffman-encoded.

FIGS. 24A and 24B show difference multivalue image encoders, respectively.

An image signal input to the encoders B 26 and B 32 in FIG. 21 is the YCrCb color-converted in accordance with equation (1). This signal is input to an encoder B shown in FIG. 24B, i.e., and orthogonal transformation circuit 456. The arrangement of the orthogonal transformation circuit 456 is the same as that in the first embodiment.

A decoder B (41 and 42 in FIG. 23) can be obtained by performing the conversion opposite to that of the encoder B in FIG. 6B. That is, Huffman codes of the DC and AC components are decoded, and inverse DCT conversion of the DCT coefficients is performed in units of blocks each consisting of 8 pixels×8 pixels.

The detailed arrangement of the encoder A 25 in FIG. 21 is shown in FIG. 24A. Dynamic arithmetic encoding is performed in this embodiment. Since encoding and decoding are identical in arithmetic encoding, only the encoding unit will be described in detail below.

Binary data of an image to be encoded is read out from the binary image memory 22 in FIG. 21 and is input to a prediction state detection circuit 450 in FIG. 24A in an order of R, G, and B.

The prediction state detection circuit 450 outputs a prediction state signal S 206 constituted by encoded neighboring pixels with respect to a pixel of interest. The detection circuit 450 also outputs encoded pixel data X 217 synchronized with a signal S 116. The two output signals are supplied to and encoded by a dynamic arithmetic encoder 453.

Figure 25:
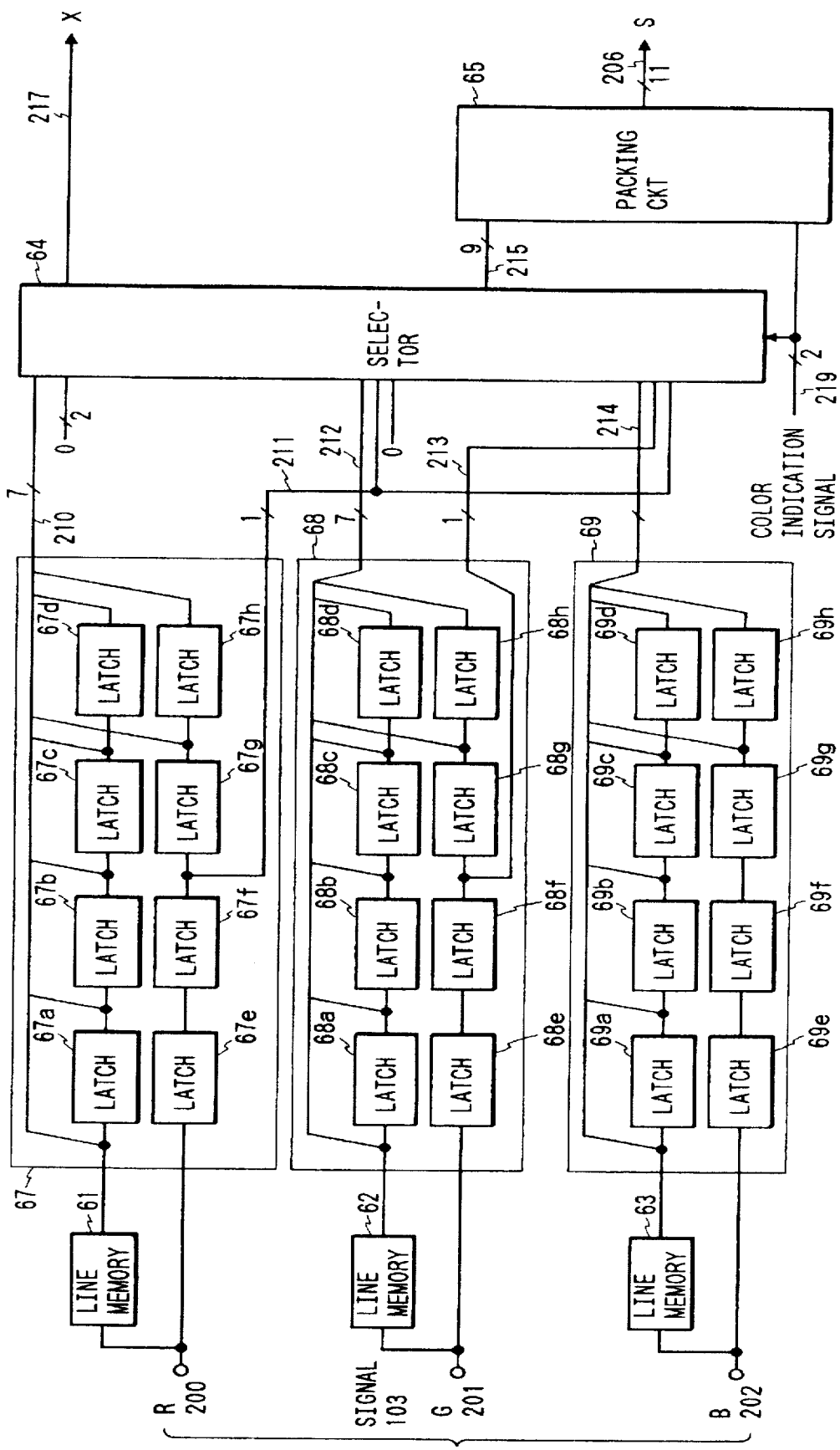
FIG. 25 is a block diagram of a prediction state detection circuit.

FIG. 25 is a block diagram of the prediction state detection circuit 450, and FIGS. 26A to 26C show pixel positions of the respective color components for state prediction.

FIG. 26A shows reference pixels of the first color (R in this embodiment). Seven encoded neighboring pixels of an encode pixel indicated by * are referred to.

FIG. 26B shows reference pixels of the second color (G in this embodiment). Seven pixels as in FIG. 26A and a pixel at the same position as that of the first color, i.e., a total of eight pixels, are referred to.

FIG. 26C shows reference pixels of the third color (B in this embodiment). Seven pixels as in FIG. 26A, and pixels at the same positions as those of the first and second pixels, i.e., a total of nine pixels, are referred to.

In the arrangement of FIG. 25, a plurality of pixels at the reference pixel positions shown in FIGS. 26A to 26C are referred to, and states in units of color components are detected. An operation of the arrangement in FIG. 25 will be described below.

A signal 103 consisting of three bits respectively for R, G, and B is input to latches 67 to 69 as R, G, and B data 200 to 202. At the same time, the signal 103 is input to line memories 61, 62, and 63. R, G, and B data each delayed by one line are stored in the line memories 61 to 63, respectively. One-clock delayed data are respectively stored in latches 67a to 67h, latches 68a to 68h, and latches 69a to 69h.

In the latches 67, five pixel data on the previous line of the encode line can be referred to by an output from the line memory 61 and outputs from the latches 67a, 67b, 67c, and 67d which receive an output from the line memory 61. The two encoded pixels on the encode line can be referred to by outputs from the latches 67g and 67h. The seven pixel data constitute a reference pixel signal 210 for detecting the state of R, i.e., the first color. R data 211 for the encode pixel is output from the latch 67f to detect the states of the remaining colors, i.e., G and B.

Latches 68 and 69 having the same arrangement as that of the latches 67 are formed for the data G 201 and B 202, respectively. Seven pixel data as in the latches 67 are output as a reference pixel signal 212 or 214 from the latch 68 or 69.

The latch 68f of the latches 68 outputs G data 213 of the encode pixel for detecting the state of B.

A selector 64 switches a reference pixel signal in accordance with a 2-bit color indication signal 219 representing a color corresponding to the each color data output. More specifically, when the color indication signal 219 represents R, the selector 64 selects the reference pixel signal 210 and a 2-bit zero signal. When the color indication signal 219 represents G, the selector 64 selects the reference pixel signal 212, the R signal 211, and a 1-bit zero signal. When the color indication signal 219 represents B, the selector 64 selects the reference pixel signal 214, the R signal 211, and the G signal 213.

A 9-bit selection signal 215 and the 2-bit color indication signal 219 are packed into an 11-bit signal by a packing circuit 65. The 11-bit signal serves as a state signal S 206. Therefore, the state signal $S_1$ represents the color of a pixel to be encoded and states of neighboring pixels. More specifically, the state signal represents $2^7$, $2^8$, and $2^9$ states for R, G, and B.

The selector 64 outputs a pixel signal X 217 to be encoded in synchronism with the state signal S 206 of the neighboring pixels.

Figure 27:
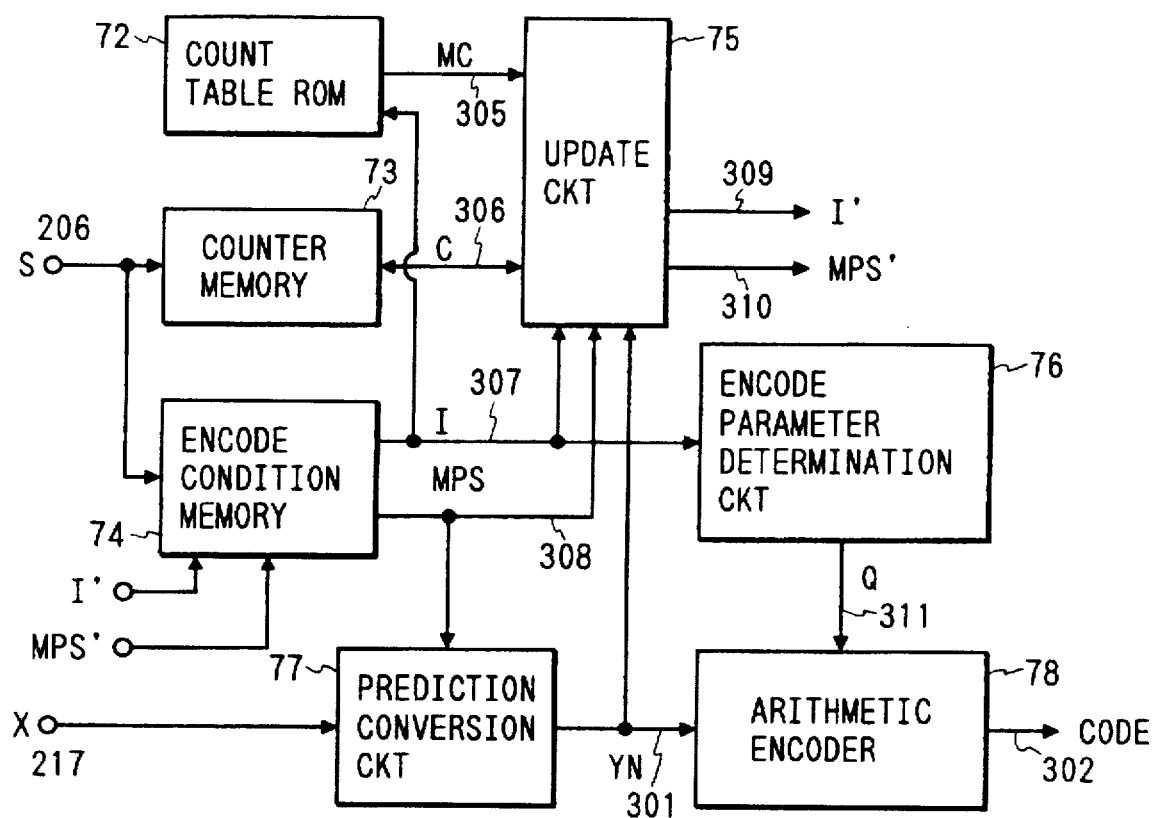
FIG. 27 is a block diagram of a dynamic encoder.

FIG. 27 is a block diagram of the dynamic arithmetic encoder 453 in FIG. 24A.

Arithmetic encoding used in this embodiment is the same as that in the first embodiment.

The encoder 453 for performing arithmetic encoding will be described with reference to the block diagram of FIGS. 24A.

The state signal S 206 from the prediction state detection circuit 450 in FIG. 24A is input to a counter memory 73 and an encode condition memory 74 in FIG. 27.

A most probable symbol (MPS) 308 which serves as a symbol which tends to appear and an index I 307 representing an encode condition including an appearance probability of an LPS in arithmetic encoding (to be described later) are stored in the encode condition memory 74 in units of states represented by the state signal S 206.

The MPS 308 read out from the encode condition memory 74 in accordance with the color and state of an image to be encoded is input to a prediction conversion circuit 77. The prediction conversion circuit 77 generates a YN signal 301 which is set at "0" when a serial pixel signal X 217 from the prediction state detection circuit 450 in FIG. 24 coincides with the MPS 308.

The YN signal 301 is input to an update circuit 75. When the YN signal is set at "0", the update circuit 75 increments a corresponding one of the count values stored in the counter memory 73. If a count value C 306 stored in the counter memory 73 coincides with a preset value MC 305 from a count table ROM 72, the update circuit 75 updates the count to increase an index I 307 (i.e., in a direction to reduce the appearance probability a of the LPS) (in this case, the MPS is not inverted).

Note that the count table ROM 72 supplies, to the update circuit 75, the MPS count C 305 (FIG. 17) determined in corresponding to the index I representing the appearance probability q of the LPS.

When the MPS 308 does not coincide with the pixel signal X 217, i.e., when the YN signal from the prediction conversion circuit 77 is set at "1", the update circuit 75 reduces the count value to decrease the index I 307 (i.e., in a direction to increase the appearance probability q of the LPS). When a YN signal of level "0" is received in an index state of "1", the MPS is inverted (0→1 or 1→0). Outputs I' 309 and MPS' 310 from the update circuit 75 represent updated index values. These values are stored in the encode condition memory 74 again.

An encode parameter determination circuit 76 sets an encode parameter Q 311 of arithmetic encoding in an arithmetic encoder 78 on the basis of the value of the index I 307. The arithmetic encoder 78 performs arithmetic encoding of the YN signal 301 from the prediction conversion circuit 77 by using the parameter Q 311, thereby obtaining a code 302.

Static encoding can be easily performed by not updating the values I and MPS while an initial value is supplied to the encode condition memory 74.

Figure 28:
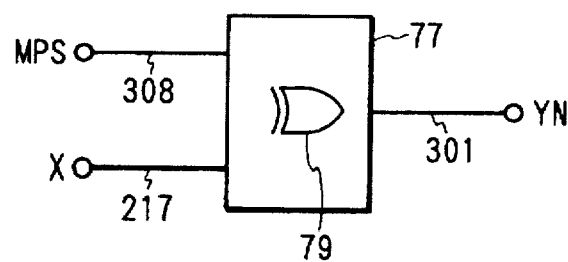
FIG. 28 is a block diagram of a prediction transformation circuit.

FIG. 28 is a block diagram of the prediction conversion circuit 77. The serial pixel signal X 217 and the MPS 308 are input to an EX-OR gate 79. When the serial pixel signal X 217 coincides with the MPS 308 in accordance with the truth table in FIG. 18, a YN signal 301 of level "0" is output from the EX-OR gate 79. Otherwise, a YN signal 301 of level "1" is output from the EX-OR gate 79.

Figure 29:
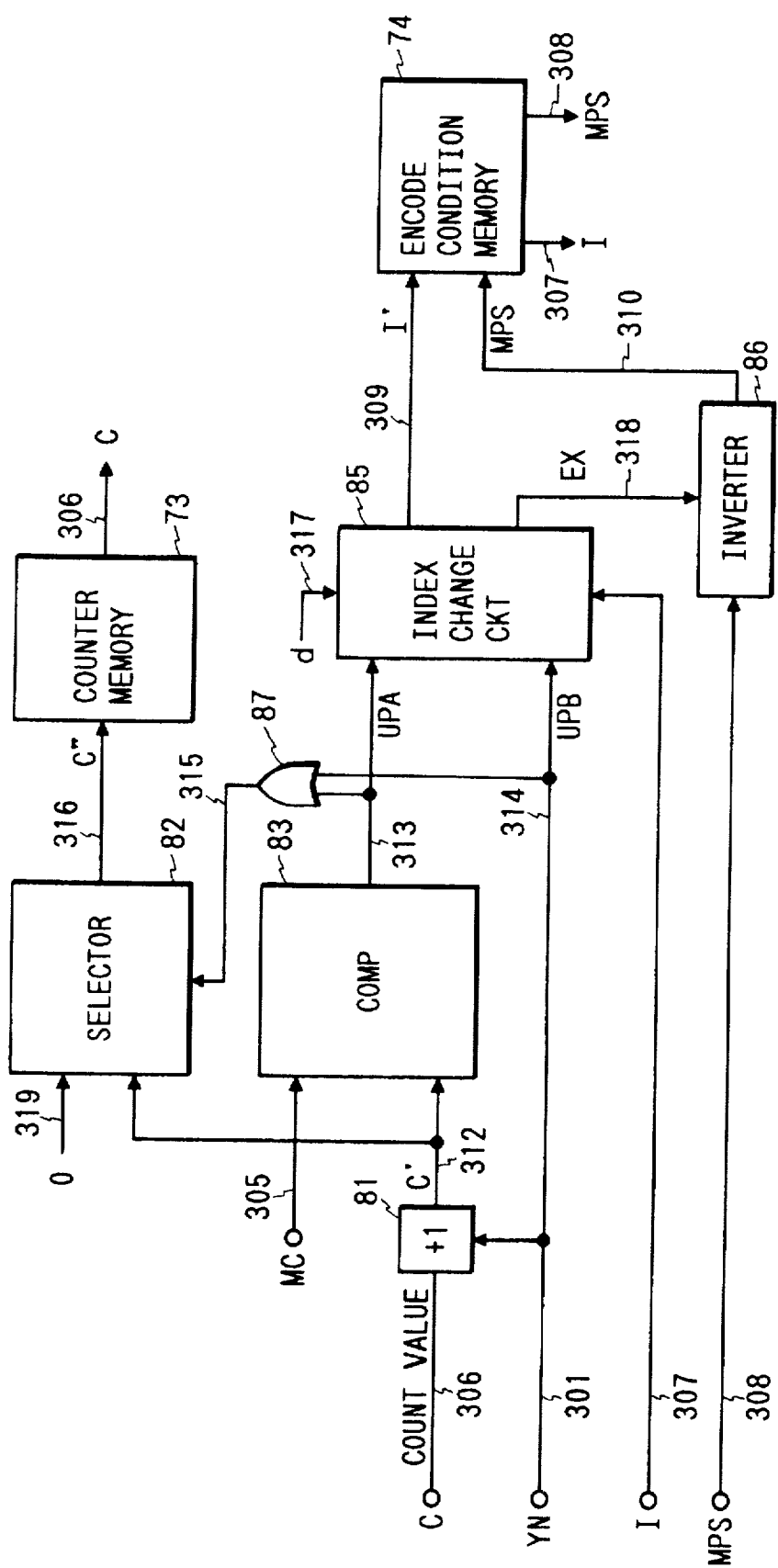
FIG. 29 is a block diagram of an update circuit.

FIG. 29 is a block diagram of the update circuit 75. When the YN signal 301 is set at "0", the count value C 306 from the counter memory 73 is incremented by one by an adder 81, thereby obtaining a signal C' 312. This signal value is compared with the MC 305 from the count table ROM 72 by a comparator 83. If the value C' coincides with the value MC, an update signal UPA 313 is set to be "1".

The YN signal 301 serves as an update signal UPB 314. The signals UPA and UPB are input to an index change circuit 85. The signals UPA and UPB are logically ORed by an OR gate 87. An output signal 315 from the OR gate 87 serves as a switching signal for a selector 82.

When the signal 315 is set at "1", the selector 82 selects a 0 signal 319 for resetting the value of the counter memory 73. Otherwise, the selector 82 selects the output signal C' 312 from the adder 81 and outputs it as a counter update signal C" 316. The signal C" 316 is stored in the counter memory 73. Therefore, when the serial pixel signal X 115 does not coincide with the MPS 308 and this non-coincident state continues a predetermined number of times, the count value of the counter memory 73 is reset.

The index change circuit 85 receives a signal d 317 (normally d=1) for controlling index update steps, the update signals UPA 313 and UPB 314, and the present index I 307 from the encode condition memory 74.

FIG. 19 is a table showing an index update method in the index change circuit 85 (the update steps in FIG. 19 are given as d=1 and d=2). A present index I, an update step condition d, UPA, and UPB are referred to in this table to obtain an updated index I'.

If I=1 and UPB=1 (i.e., the serial pixel signal X 115 does coincide with the MPS 308), an EX signal 318 is set. When the EX signal 318 is set at "1", an inverter 86 inverts the symbol of the present MPS 308 (0→1 or 0→1) to obtain an updated MPS' 310. However, if the EX signal is set at "0", the MPS' is not changed.

The updated I' 309 and the updated MPS' 310 are stored in the encode condition memory 74 and are used as index I and the MPS of the next processing. Note that the update method shown in FIG. 19 may be realized by a table constituted by a ROM or a logic circuit using an adder and a subtracter.

As described above, when MPSs corresponding to the number of MPSs determined in accordance with the value of the index I representing the appearance probability q of the LPS approximated with the polynomial of powers of 2 appear, d is added to the index I to reduce the appearance probability q of the LPS used for arithmetic encoding.

However, when an LPS is generated, the index I is reduced by d to increase the appearance probability q of the LPS used for arithmetic encoding. In addition, if an LPS appears in a state wherein the appearance probability q of the LPS represents 0.5 (i.e., the index I is set at "1"), the MPS is inverted.

Arithmetic encoding with high encoding efficiency can be achieved by adaptively updating the index I and the MPS for the input image.

As described above, if a multivalue color signal represents an edge portion is determined for each block. Blocks determined as edge portions are binarized, and information preservation encoding is performed by dynamic arithmetic encoding. Therefore, a sharp binary color image representing an edge portion such as a character or a line can be encoded at a high compression ratio so as to almost eliminate degradation of image quality.

In a multivalue color image (e.g., a color photograph) having a small number of edge portions, DCT Huffman encoding is hierarchically performed for a low-frequency image, i.e., a difference image obtained by subtracting a binary image of the edge portion from the original image, thereby performing encoding at a high compression ratio.

In addition, degradation of image quality of a binary color image and a multivalue color image can be prevented, and these images can be encoded at high compression ratios. At the same time, preservation of an edge and the like as a characteristic feature of a low-resolution image transmitted upon hierarchical encoding can be achieved to allow the operator to immediately grasp the overall image.

As has been described above, according to the present invention, there is provided a color image encoding apparatus for hierarchically encoding a multivalue color image, comprising a means for extracting a feature portion from an original image, and generating means for binarizing an image portion extracted by the extracting means and generating a binary color image. Since the binary color image can be encoded in accordance with information preservation encoding, and a difference image between the original image and the binary color image is hierarchically encoded, a color image including both a binary color image and a multivalue color image can be encoded without causing any degradation. An image can be immediately grasped at the time of decoding.

In the above embodiments, the multivalue image is encoded in accordance with a sequential encoding method, but may be encoded in accordance with a progressive encoding method.

The present invention is not limited to color image communication. The present invention is also applicable to a color image file apparatus.

The present invention is not limited to the particular embodiments described above. Various changes and modifications may be made within the scope of the appended claims.

What is claimed is:

1. An image processing apparatus comprising:

input means for inputting image data representing an image;

extraction means for extracting line image data representing a line image portion, from the image data input by said input means;

first encode means for outputting first encode data, by encoding in a first resolution the line image data extracted by said extraction means;

second encode means for encoding second encode data, by encoding in a second resolution the line image data extracted by said extraction means, said first and second encode means encoding the line image data representing the same line image portion;

third encode means for outputting third encode data, by encoding image data other than the line image data; and hierarchical output means for sending the first, second and third encode data, said hierarchical output means sending or outputting the first encode data prior to the second encode data.

2. An apparatus according to claim 1, wherein the third encode data includes encode data representing a low-frequency component of the image data other than the line image data and encode data representing a high-frequency component thereof, and said hierarchical output means outputs the low-frequency component prior to the high-frequency component.

3. An apparatus according to claim 1, wherein the first resolution is lower than the second resolution.

4. An apparatus according to claim 1, wherein said extraction means judges the line image portion by detecting an edge of the image.

5. An apparatus according to claim 1, further comprising fourth encode means for outputting fourth encode data, by encoding in a third resolution the line image data extracted by said extraction means, and wherein said hierarchical output means outputs the fourth encode data subsequent to the second encode data.

6. An apparatus according to claim 1, wherein said first and second encode means perform arithmetic encoding.

7. An apparatus according to claim 1, wherein said third encode means performs the encoding by using frequency conversion.

8. An image processing method comprising:

an input step of inputting image data representing an image;

an extraction step of extracting line image data representing a line image portion, from the image data input in said input step;

a first encode step of outputting first encode data, by encoding in a first resolution the line image data extracted in said extraction step;

a second encode step of encoding second encode data, by encoding in a second resolution the line image data extracted in said extraction step, said first and second encode steps encoding the line image data representing the same line image portion;

a third encode step of outputting third encode data, by encoding image data other than the line image data; and a hierarchical output step of sending the first, second and third encode data, said hierarchical output step sending or outputting the first encode data prior to the second encode data.

9. An image processing apparatus comprising:

input means for inputting image data representing an image;

extraction means for extracting line image data representing a line image portion, from the image data input by said input means;

first encode mans for outputting first encode data by encoding the line image data extracted by said extraction means;

second encode means for outputting second encode data, by extracting a low-frequency component of the image data other than the line image data and encoding the low-frequency component;

third encode means for outputting third encode data, by extracting a high-frequency component of the image data other than the line image data and encoding the high-frequency component, said second and third encode means encode the image data representing the same image; and sending means for sending the first, second and third encode data, said sending means sending the second encode data prior to the third encode data.

10. An apparatus according to claim 9, wherein said extraction means judges the line image portion by detecting an edge of the image.

11. An apparatus according to claim 9, wherein said first encode means performs arithmetic encoding.

12. An apparatus according to claim 9, wherein said second and third encode means perform the encoding by using frequency conversion.

13. An image processing method comprising:

an input step of inputting image data representing an image;

an extraction step of extracting line image data representing a line image portion, from the image data input in said input step;

a first encode step of outputting first encode data by encoding the line image data extracted in said extraction step;

a second encode step of outputting second encode data, by extracting a low-frequency component of the image data other than the line image data and encoding the low-frequency component;

a third encode step of outputting third encode data, by extracting a high-frequency component of the image data other than the line image data and encoding the high-frequency component, said second and third encode steps encode the image data representing the same image; and a sending step of sending the first, second and third encode data, said sending step sending the second encode data prior to the third encode data.

14. An image processing apparatus comprising:

reception means for receiving first encode data obtained by encoding a line image portion of a predetermined image in a first resolution, second encode data obtained by encoding the same portion as the line image portion in a second resolution, and third encode data obtained by encoding a portion other than the line image portion;

first decode means for decoding the first and second encode data in an order of the first and second encode data;

second decode means for decoding the third encode data; and display means for synthesizing an image decoded by said first decode means and an image decoded by said second decode means in a same image plane, and for displaying the image plane.

15. An apparatus according to claim 14, wherein the first resolution is lower than the second resolution.

16. An image processing method comprising:

a reception step of receiving first encode data obtained by encoding a line image portion of a predetermined image in a first resolution, second encode data obtained by encoding the same portion as the line image portion in a second resolution, and third encode data obtained by encoding a portion other than the line image portion;

a first decode step of decoding the first and second encode data in the order of the first and second encode data;

a second decode step of decoding the third encode data; and a display step of synthesizing an image decoded in said first decode step and an image decoded in said second decode step in a same image plane, and of displaying the image plane.

* * * * *

UNITED STATES PATENT AND TRADEMARK OFFICE
CERTIFICATE OF CORRECTION

PATENT NO. : 5,761,342

DATED : June 2, 1998

INVENTOR : TADASHI YOSHIDA

It is certified that error appears in the above-identified patent and that said Letters Patent is hereby corrected as shown below:

IN THE DRAWING

Sheet 8 of 23  "REFERENC" should read --REFERENCE--.

COLUMN 1 line 4,  "Apr." should read --filed Apr.--.

COLUMN 3 line 53,  "like" should read --like,--; and
   line 56,  "21" should read --21,--.

COLUMN 4 line 5,  "108" should read --108,--; and
   line 58,  "3A)" should read --3A),--.

COLUMN 5 line 11,  "preserved" should read --preserved,--;
   line 17,  "image" should read --image,--;
   line 39,  "109" should read --109,--; and
   line 52,  "pixels" should read --pixels,--.

UNITED STATES PATENT AND TRADEMARK OFFICE
CERTIFICATE OF CORRECTION

PATENT NO. : 5,761,342

DATED : June 2, 1998

INVENTOR : TADASHI YOSHIDA

It is certified that error appears in the above-identified patent and that said Letters Patent is hereby corrected as shown below:

COLUMN 6 line 56, "subscan" should read --sub-scan--;
   line 60, "coding" should read --coding,--; and

COLUMN 7 line 45, "image" should read --image,--.

COLUMN 11 line 10,  "are 1" should read --are--;
   line (9)  "$qe2^1=2^{-1-2-4}$" should read
          --$qe2^1=2^{-1}-2^{-4}$--;
   line (10) "$qe3^1=2^{-1+2-3}$" should read
          --$qe3^{-1}=2^{-2}+2^{-3}$--; and
   line 15,  "or 0→1)" should read --or 1→0)--".

COLUMN 12 line 33,  "NMI" should read --Nmi--.

COLUMN 13 line 8, "shown)" should read --shown).--.

UNITED STATES PATENT AND TRADEMARK OFFICE
CERTIFICATE OF CORRECTION

PATENT NO. : 5,761,342

DATED : June 2, 1998

INVENTOR : TADASHI YOSHIDA

It is certified that error appears in the above-identified patent and that said Letters Patent is hereby corrected as shown below:

COLUMN 17 line 5, "to the" should read --to--; and
line 54, "a of" should read --q of--.

COLUMN 18 line 53, "or 0→1)" should read --or 1→0)--.

COLUMN 20 line 61, "mans" should read --means--.

Signed and Sealed this

Second Day of March, 1999

Attest:

Q. TODD DICKINSON

*Attesting Officer*     *Acting Commissioner of Patents and Trademarks*